(12) United States Patent
Hutchins

(10) Patent No.: US 6,435,804 B1
(45) Date of Patent: Aug. 20, 2002

(54) LIFTING APPARATUS

(76) Inventor: Mark Hutchins, 431 San Carlos Ave., El Granada, CA (US) 94018

( * ) Notice: Subject to any disclaimer, the term of this patent is extended or adjusted under 35 U.S.C. 154(b) by 0 days.

(21) Appl. No.: 09/575,220

(22) Filed: May 19, 2000

Related U.S. Application Data

(60) Provisional application No. 60/134,872, filed on May 19, 1999.

(51) Int. Cl.[7] .................................................. A61G 3/08
(52) U.S. Cl. ........................ 414/540; 414/541; 414/921; 187/200
(58) Field of Search ................................ 414/540, 541, 414/545, 921; 187/200

(56) References Cited

U.S. PATENT DOCUMENTS

| | | | |
|---|---|---|---|
| 2,701,656 A | * 2/1955 | French | ........................ 414/545 |
| 4,180,366 A | * 12/1979 | Roth et al. | ................... 414/540 |
| 4,353,436 A | 10/1982 | Rice et al. | |
| RE31,178 E | 3/1983 | Deacon | |
| 4,664,584 A | 5/1987 | Braun et al. | |
| 4,953,665 A | 9/1990 | Paquin | |
| 4,969,793 A | * 11/1990 | Pawl | ..................... 414/540 X |
| 4,977,981 A | 12/1990 | Pacquin | |
| 5,180,275 A | 1/1993 | Czech et al. | |
| 5,228,538 A | 7/1993 | Tremblay | |
| 5,234,311 A | 8/1993 | Loduha, Jr. et al. | |
| 5,261,779 A | 11/1993 | Goodrich | |
| 5,308,215 A | 5/1994 | Saucier | |
| 5,320,135 A | 6/1994 | Pierrou | |
| 5,346,355 A | * 9/1994 | Riemer | ................... 414/541 X |
| 5,373,915 A | 12/1994 | Tremblay | |
| 5,378,105 A | * 1/1995 | Palko | ......................... 414/540 |
| 5,445,488 A | 8/1995 | Saucier et al. | |
| 5,524,952 A | 6/1996 | Czech et al. | |
| 5,533,594 A | 7/1996 | Tremblay et al. | |
| 5,556,250 A | 9/1996 | Fretwell et al. | |
| 5,605,431 A | 2/1997 | Saucier et al. | |
| 5,636,399 A | 6/1997 | Tremblay et al. | |
| 5,806,632 A | 9/1998 | Budd et al. | |
| 5,832,555 A | 11/1998 | Saucier et al. | |
| 5,865,593 A | 2/1999 | Cohn | |
| 5,944,473 A | 8/1999 | Saucier et al. | |
| 6,024,528 A | * 2/2000 | Taylor | ................... 414/541 X |
| 6,042,327 A | 3/2000 | DeLeo et al. | |
| 6,043,741 A | 3/2000 | Whitmarsh | |
| 6,062,805 A | 5/2000 | Tremblay et al. | |
| 6,109,395 A | * 8/2000 | Storm | .................... 414/545 X |

* cited by examiner

*Primary Examiner*—Steven A. Bratlie
(74) *Attorney, Agent, or Firm*—Gray Cary Ware & Freidenrich LLP

(57) ABSTRACT

The disabled person lifting apparatus permits an object, such as a wheelchair user, to be moved between a first position and a second position in which the first and second positions are at different vertical distances. For a vehicle wheelchair lifting apparatus, the first position may a ground level and the second position may be at the height of the door of the vehicle so that the disabled person may enter the vehicle. When the lifting apparatus is not being used, it may be stored underneath the vehicle or in the floor of the vehicle. The lifting apparatus may include a pair of lifting arms at each side of a lifting platform that are driven by an electrical motor or a hydraulic ram. The lifting apparatus may move in a vertical direction with no horizontal movement.

14 Claims, 19 Drawing Sheets

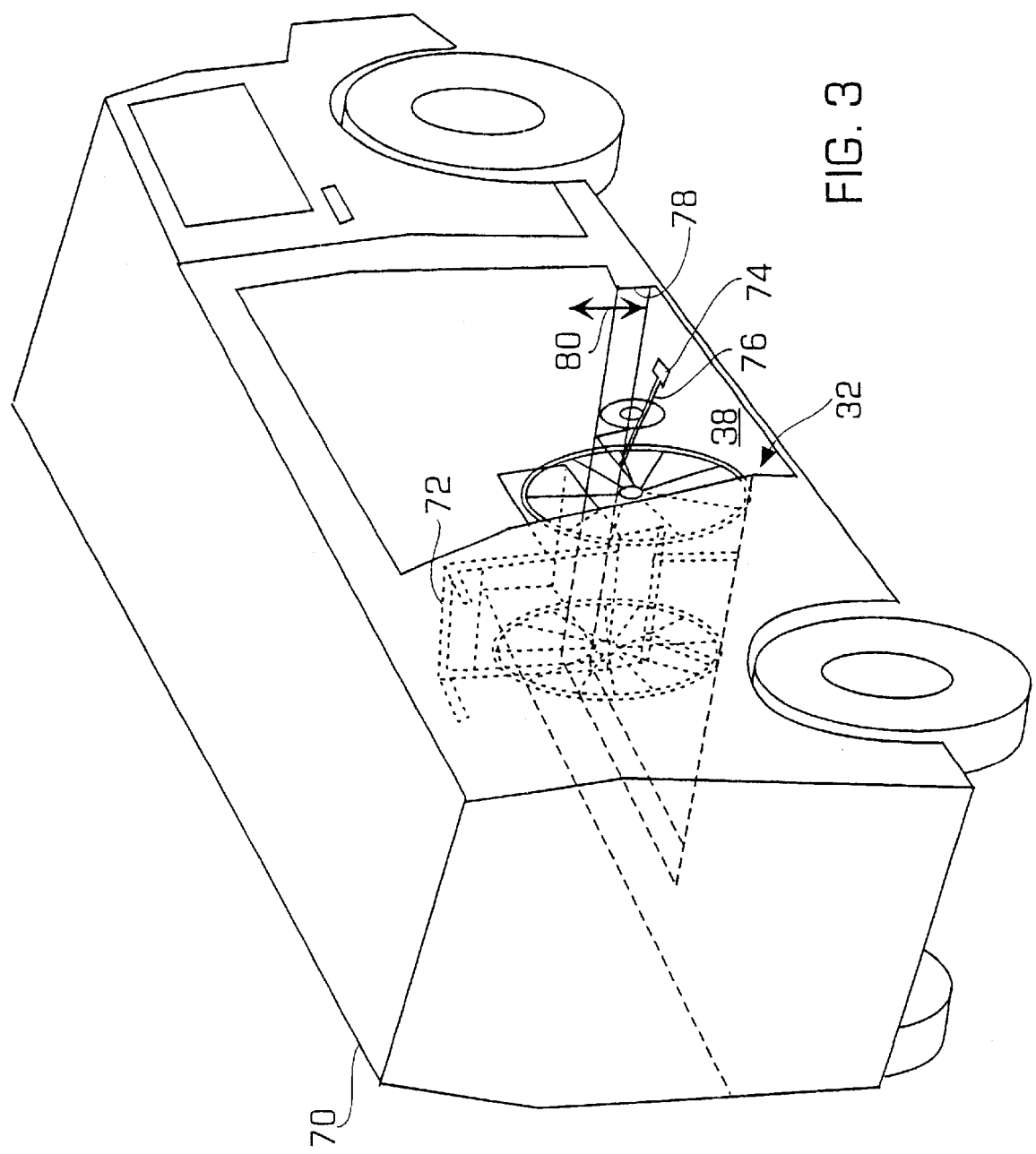

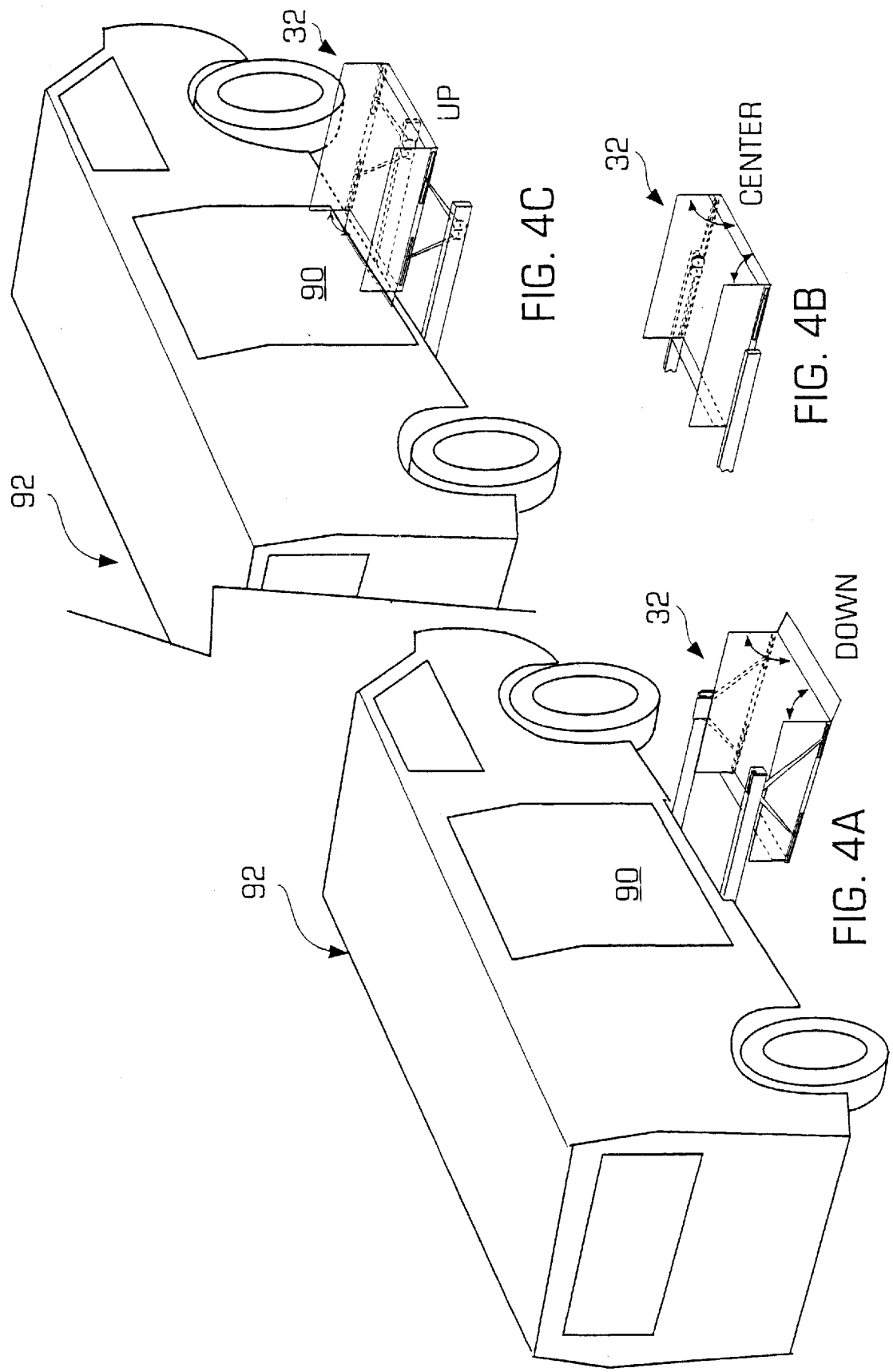

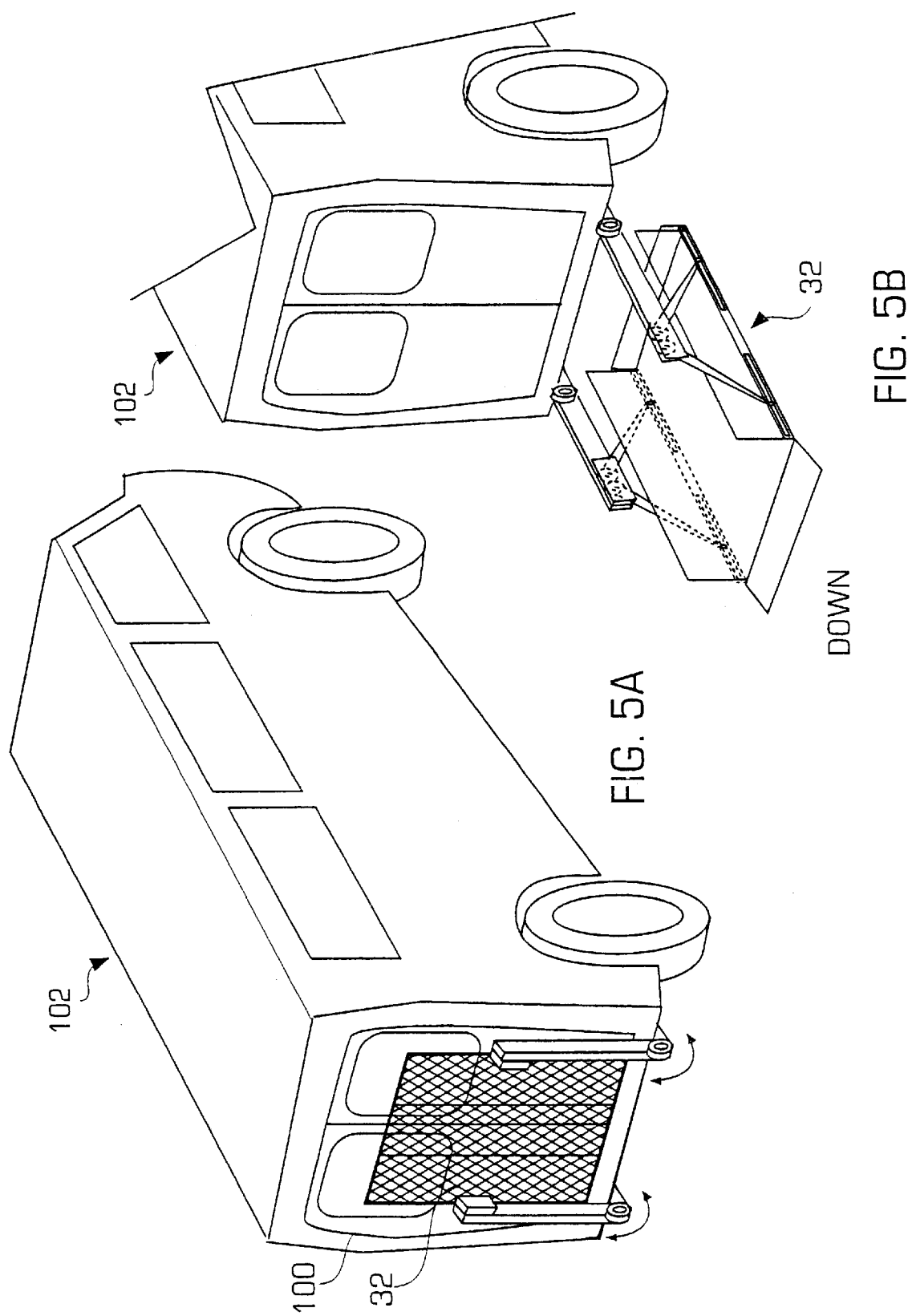

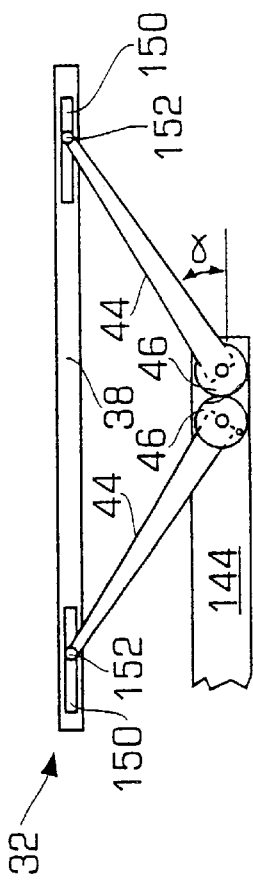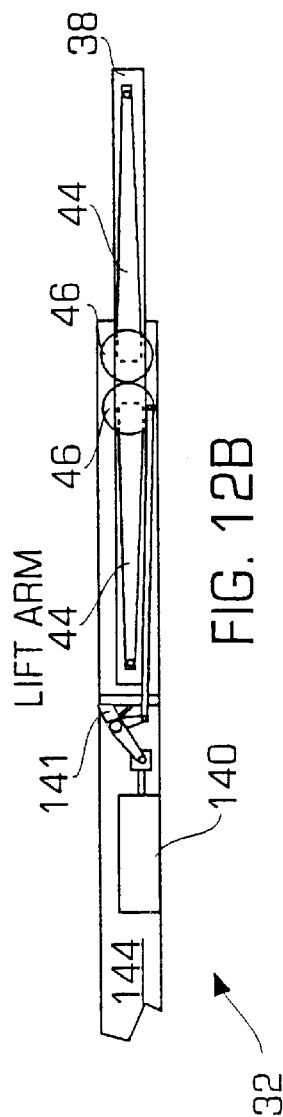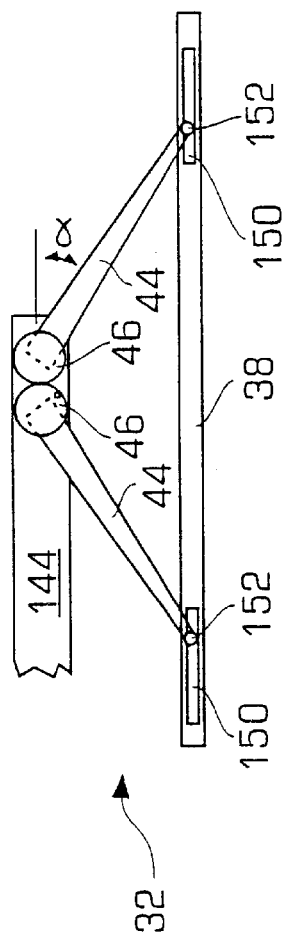

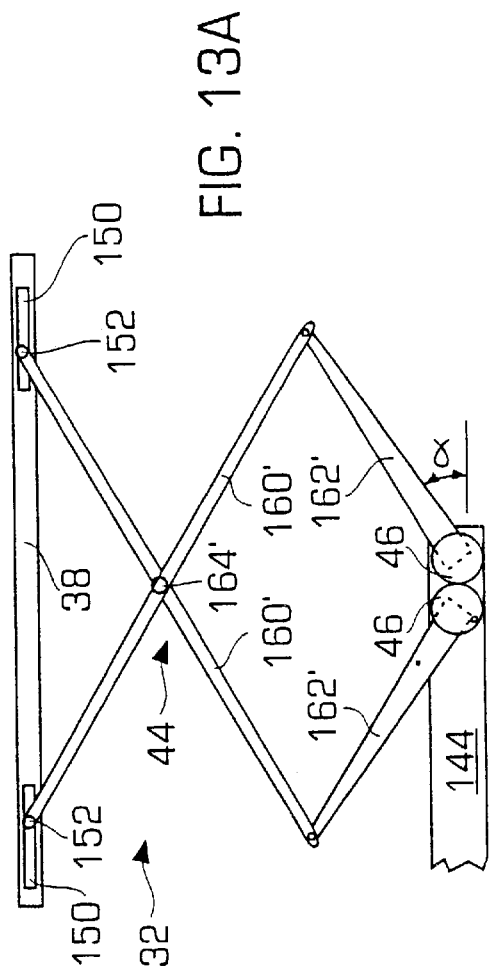
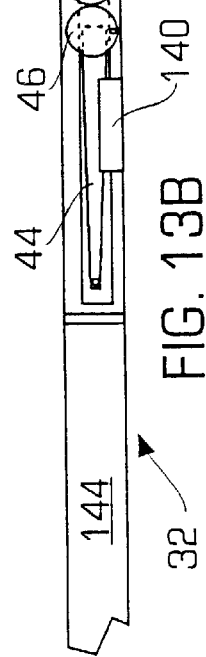
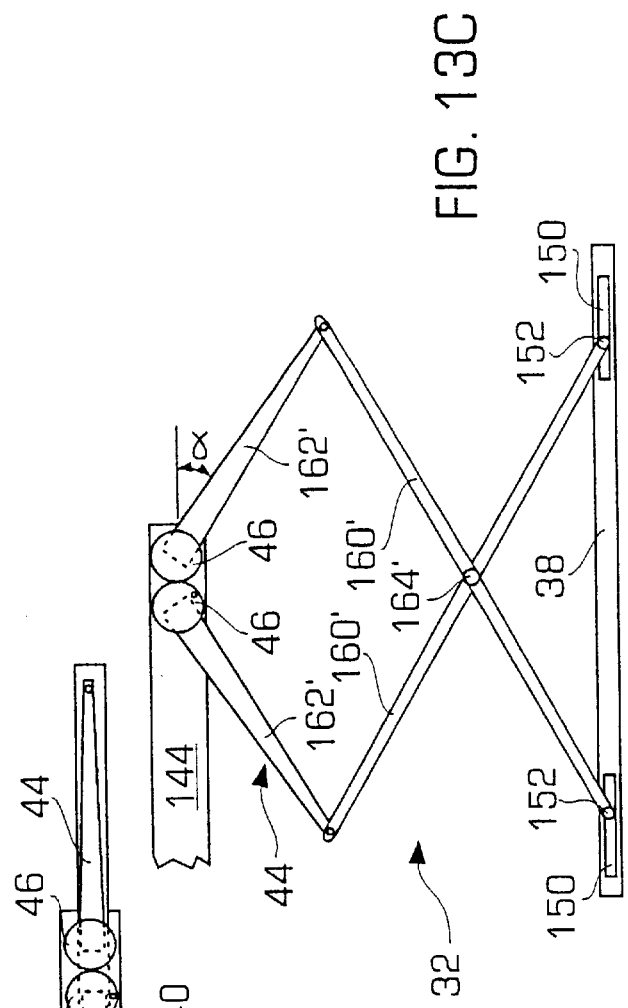
FIG. 13A
FIG. 13B
FIG. 13C

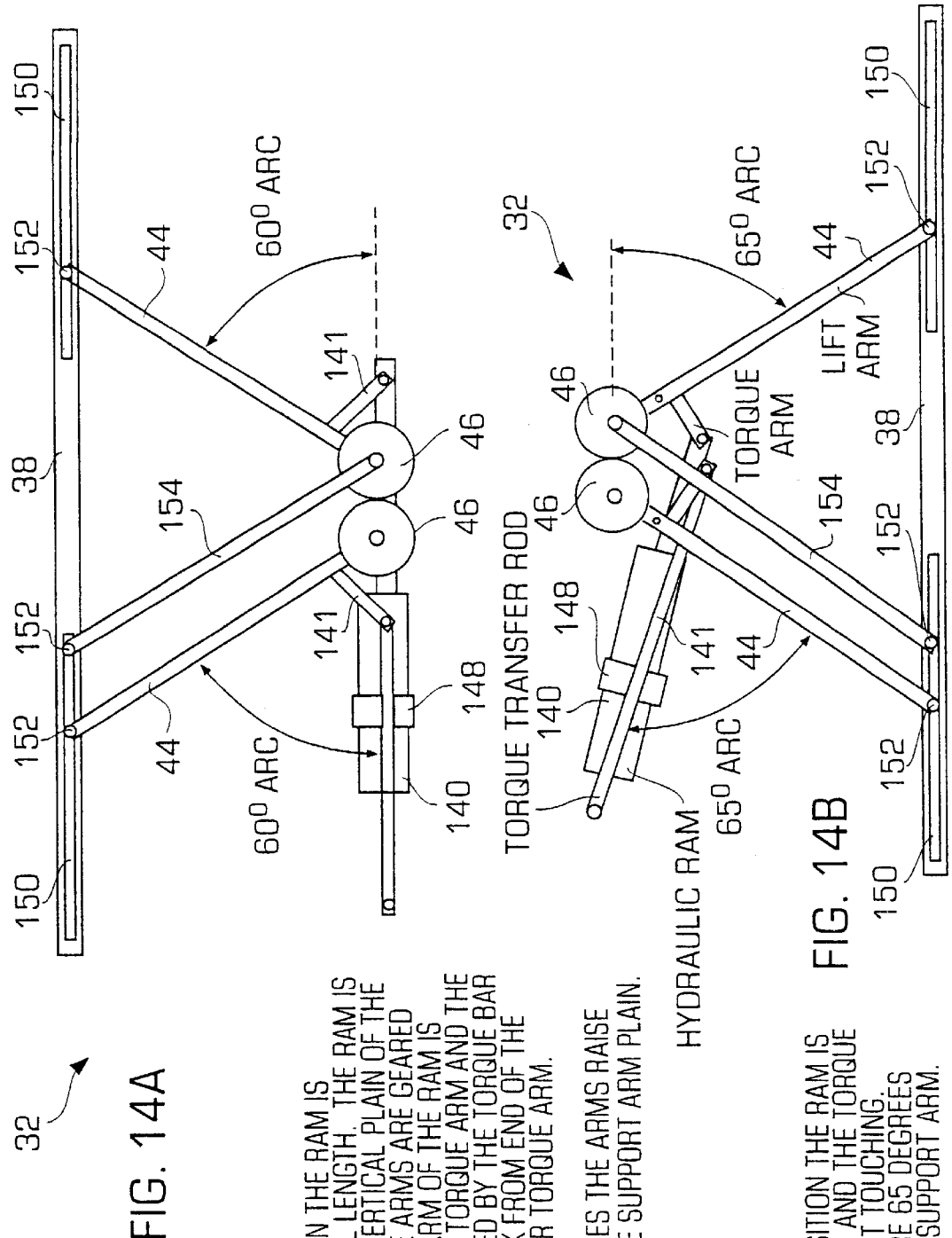

LIFTING APPARATUS

This application claims priority from provisional application No. 60/134,872, filed May 19, 1999.

BACKGROUND OF THE INVENTION

This invention relates generally to an apparatus for lifting a weight from a first level to a second level and in particular to a wheelchair lift for lifting a wheelchair bound individual from street level into a transportation vehicle, such as a van.

For many years, disabled people had little or no disabled-accessible transportation or mobility technology available in the United States. Today, there are several companies that sell a conversion kit for a van that retrofits a wheelchair lift onto a van so that the disabled person has transportation that is wheelchair accessible. The problem is that the available conversion kits are not satisfying the needs of the disabled people. The satisfaction level of the customers is not very high due to high costs and inadequate lift systems.

These conventional van conversion kits have a number of problems that lead to the low customer satisfaction. First, these conventional van conversion kits are very expensive (about $10,000–$16,000). When combined with the cost of a new van ($30,000), the overall cost makes it very difficult for less wealthy disabled people to be able to afford to have a wheelchair accessible transportation vehicle. Thus, although the technology exists to provide disabled people with wheelchair accessible transportation, many disabled people cannot afford to have wheelchair accessible transportation.

In addition, the wheelchair lifting apparatus currently on the market require a large amount of vertical storage space that significantly decreases the amount of ground clearance of the vehicle into which they are installed. In particular, these conventional wheelchair lifting apparatus, when not in use, are stored underneath the van and hang down approximately 6–9 inches. Thus, the distance between the road or an obstacle and the bottom of the wheelchair lifting apparatus (the ground clearance) is small (e.g., about six inches or less). Thus, the wheelchair lifting apparatus may be easily damaged, such as by running over a log in the road, that may cost as much to fix as a new lifting apparatus. In addition, the large height of the conventional lifting apparatus units prevent these conventional lifting apparatus from being installed in any vehicles other than full-size vans since only vans have a clearance height (the distance between the bottom of the van and the ground) sufficient to accommodate the conventional lifting apparatus. In fact, most conventional lifting apparatus require a half ton van to be outfitted with a lift kit to raise them off the ground far enough to accommodate the lifting apparatus.

One conventional lifting apparatus made by Braun, has an outer case fabricated out of aluminum to make it easier to build. However, aluminum is a fairly soft metal so that this lifting apparatus may be easily damaged. These conventional wheelchair lifting apparatus also have lifting mechanisms that are dangerous and cannot adequately support unbalances loads. In particular, the conventional lifting mechanisms may fail and cause a wheelchair board person currently on the lifting apparatus to fall to the ground causing great bodily injury to person if the wheelchair is not properly located on the platform.

In addition, conventional lifting apparatus are not built with the safety of the disabled person in mind. For example, most of the conventional wheelchair lifting apparatus have some type of railing that the disabled person may hold onto, but most conventional lifting apparatus require another person to remove the railings from a storage location and secure them for the disabled person so that the lift cannot be safely operated by the disabled person alone. As another example, some conventional lifting apparatus use a single hydraulic cylinder connected to the center of the wheelchair lifting platform to lift the disabled person that may be unable to safely lift a wheelchair that is not exactly located on the middle of the platform. As another example, many conventional wheelchair lifting apparatus move the platform both vertically and horizontally at the same time in an arc so that the horizontal motion may cause the wheelchair to roll around the platform or even worse, fall off of the platform and possibly hurt the disabled person.

The conventional lifting apparatus also cannot be used for larger vertical lifts into vehicles such as trains, high platforms or motor homes. Thus, these conventional lifting apparatus cannot be used by customers in a snow belt region who require the lifting apparatus to be installed on a four wheel drive van that requires the disabled person to be lifted more than 32 inches. The maximum lifting height of the conventional lifting apparatus is about 30 inches. The conventional lifting apparatus also cannot accommodate an extra wide wheelchair (about 34 inches wide).

Thus, the conventional lifting apparatus have a number of problems and limitations that make them less than suitable for their disabled customers. Therefore, it is desirable to provide a disabled person lifting apparatus that overcomes the above problems and limitations with conventional wheelchair lifting apparatus and it is to this end that the present invention is directed.

SUMMARY OF THE INVENTION

The disabled person lifting apparatus in accordance with the invention overcomes many of the limitations, problems and safety concerns with conventional wheelchair lifting apparatus. The disabled person lifting apparatus also has many other advantages. The disabled person lifting apparatus may be stored, when not it use, either under the floor of the vehicle or in the floor of the vehicle. The storage of the lifting apparatus in the floor of the vehicle allows the disabled person on the platform of the lifting apparatus to be secured to the platform during the trip in the vehicle instead of rolling the disabled person off of the lifting platform into the vehicle. The storage of the lifting platform in the floor of the vehicle also permits the height of the disabled person during the vehicle trip to be adjusted using the lifting apparatus.

The lifting apparatus may also operate to lift people from only one side of the lifting apparatus closest to the vehicle so that the installation of the lifting apparatus does not interfere with the drive shaft of the vehicle. In addition, the lifting apparatus may be able to lift a disabled person to a wide variety of heights. While lifting the disabled person, the lifting apparatus moves only in a vertical direction so that the wheelchair is less likely to roll on the platform since there is no horizontal motion of the lifting apparatus. Thus, it is less likely that the wheelchair user may fall off of the platform of the lifting apparatus while being lifted into a vehicle. The lifting apparatus in accordance with the invention, however, may permit the horizontal movement of the platform prior to and after the lifting operation that increases the flexibility of the positioning of the lifting platform.

The lifting mechanism of the lifting apparatus may use a pair of lifting arms on each side of the platform to ensure a level, safe lift of the disabled person. The lifting mechanism may be driven by an electric motor or by a hydraulic ram. The lifting mechanism executes a 120° positive force motion so that the platform moves solely in a vertical direction while the hydraulic arms are above or below the lifting platform. This motion provides a smooth, evenly applied lifting force during both the lifting and lowering of the platform. The lifting mechanism may be disengaged from the lifting arms and the lifting apparatus may be manually operated to provide a way of operating the lifting apparatus if the lifting mechanism fails.

The lifting apparatus may be used for various types of vehicles, such as vans, trains, recreational vehicles, automobiles, buses, as well as a short run of stairs. For larger vertical lifts, the lifting apparatus may have telescoping lifting arms so that the disabled person may be lifted up to higher distances than conventional lifting apparatus. Thus, the lifting apparatus may be used for a variety of different lifting uses. The lifting apparatus may be less than four inches in the vertical dimension when stored so that the distance between the lifting apparatus underneath a vehicle and the ground is increased so that the lifting apparatus is less likely to be damaged. The small vertical storage height of the lifting apparatus also makes it easier to install and less expensive since it does not require a reinforced metal cowling to protect it from damage due to impact with the ground. The smaller vertical height also permits less expensive, full size automobiles to be modified to include the lifting apparatus. In addition, the length and width of the lifting apparatus in accordance with the invention may be easily modified to accommodate the needs of the individual customers.

The lifting apparatus in accordance with the invention may lift a disabled person up to 34 vertical inches so that the lifting apparatus may be used in a four wheel modified van that is the usual transportation in an area with heavy snowfall each year. In fact, if the length of the platform of the lifting apparatus is increased by some amount, then the lifting height of the lifting apparatus is increased so that the lifting apparatus in accordance with the invention may have an adjustable maximum lifting height.

BRIEF DESCRIPTION OF THE DRAWINGS

FIG. 3 is a diagram illustrating the lifting apparatus in accordance with the invention stored in the floor of a vehicle;

FIGS. 4a–4c are diagrams illustrating a lifting apparatus in accordance with the invention in a down, center and up positions, respectively, when attached to the side door of a van;

FIGS. 5a–5c are diagrams illustrating a lifting apparatus in accordance with the invention in a stored, down and up positions, respectively, when attached to the rear of a van;

FIGS. 12a–12c are diagrams illustrating the lifting apparatus in a raised position, in a central position and in a lowered position, respectively;

FIGS. 13a–13c are diagrams illustrating a telescoping lifting apparatus in accordance with the invention in a raised position, a central position and a lowered position, respectively;

FIGS. 14a and 14b are diagrams illustrating more details of the embodiment of the lifting apparatus using the torque gears in the up and down positions, respectively;

DETAILED DESCRIPTION OF A PREFERRED EMBODIMENT

The invention is particularly applicable to a lifting apparatus that may be used to lift a disabled person in a wheelchair from street level into a transportation vehicle. It is in this context that the invention will be described. It will be appreciated, however, that the apparatus in accordance with the invention has greater utility since it may be generally used to lift disabled people, such as into other types of vehicles or up a flight of stairs or the lifting apparatus may be used to lift any object. Now, the disabled person lifting apparatus in accordance with the invention will be described.

Figure 1:
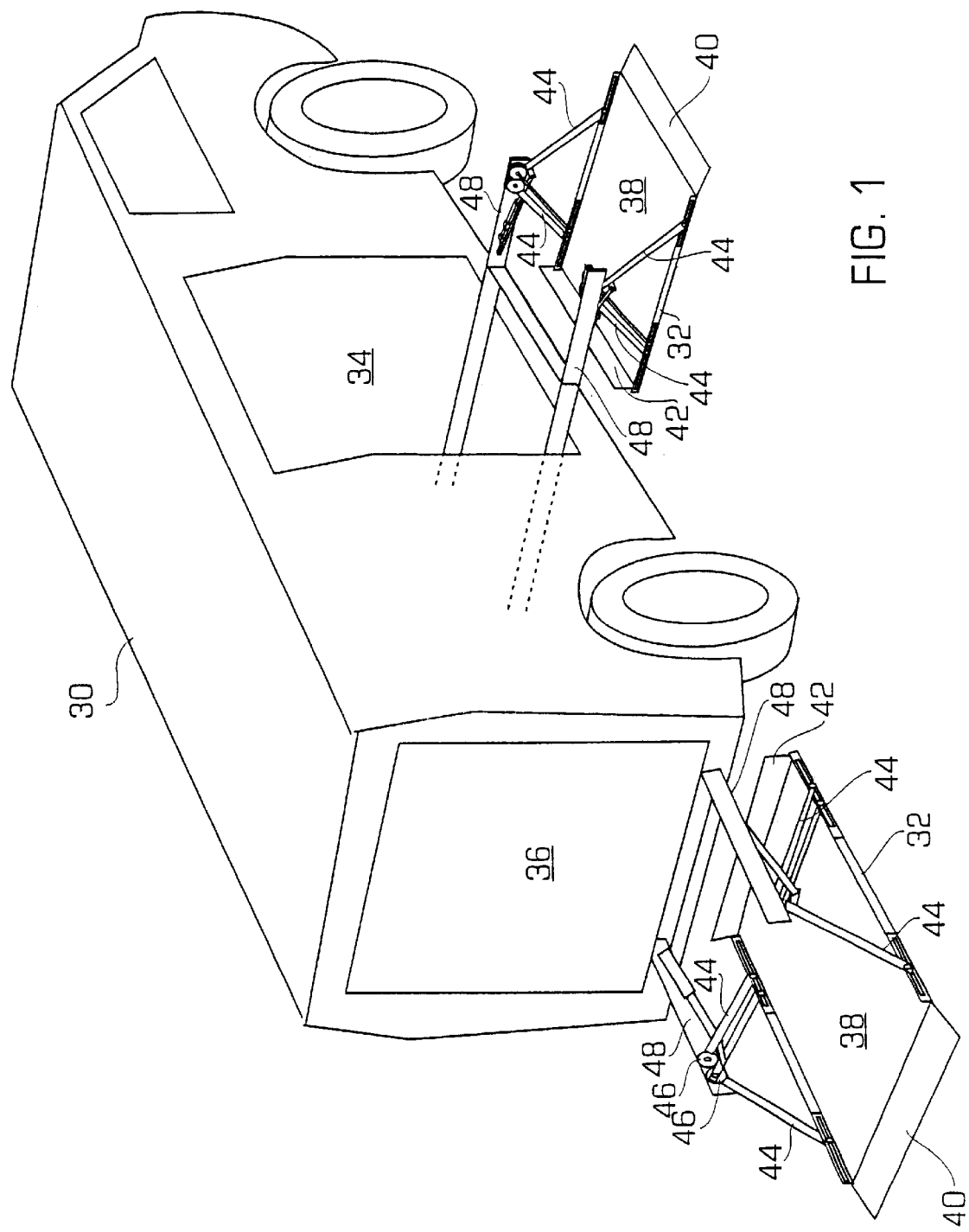
FIG. 1 is a diagram illustrating a vehicle with an embodiment of a lifting apparatus in accordance with the invention installed at a side door or a rear door of the vehicle.

FIG. 1 is a diagram illustrating a vehicle 30 with a first embodiment of a lifting apparatus 32 in accordance with the invention installed at a side door 34 or a rear door 36 of the vehicle. The vehicle 30 may be, for example, a van that has been modified to accommodate the lifting apparatus 32. The lifting apparatus 32 permits a disabled person who is in a wheelchair to get into the van. In particular, the wheelchair user may activate the lifting apparatus and move it from its storage position underneath the van or in the floor of the van to a lowered position. In the lowered position, a lifting platform 38 of the lifting apparatus is on or near the ground. The platform 38 may include a small ramp 40 that helps the wheelchair user move the wheelchair from the ground onto the platform. The ramp 40 may be locked in a vertical orientation perpendicular to the platform while the wheelchair is on the platform. The platform may also include a backstop portion 42 that prevents the wheelchair from falling off of the back of the platform. Once the wheelchair user has positioned the wheelchair on the platform, the lifting apparatus may be activated by depressing a readily accessible switch on the lifting apparatus or a remote control. The lifting apparatus then lifts the platform 38 vertically up to a second level with no horizontal motion so that the wheelchair is less likely to roll off of the platform.

The second level may be the level of the side door 34 or rear door 36 of the vehicle so that the wheelchair user may exit the platform into the vehicle. To permit the wheelchair user to exit the platform 38, the backstop portion 42 may fold down flat. Once the wheelchair user is safely in the vehicle, the lifting apparatus 32 may be returned to its storage position either underneath the vehicle or in the floor of the vehicle.

The lifting apparatus 32 may include the platform 38 that is connected to a pair of lifting arms 44 on each side of the platform. In the embodiment shown, the lifting arms may be connected to a pair of torque gears 46 that are in turn rotatably connected to a pair of rigid frame members 48 that support the lifting apparatus. The torque gears may be driven by an electric motor or a hydraulic ram as described below in more detail. If the motor or hydraulic ram fail, the motor or hydraulic ram may be disengaged from the torque gears so that the lifting apparatus may be manually operated. The frame members 48 may be rigidly connected to the frame of the vehicle. The construction of the lifting apparatus will be described in more detail below.

The lifting apparatus shown in FIG. 1 is in a lowered position resting on or near the ground with the lifting arms in the down position. As the torque gears 46 are rotated, the arms rotate through a predetermined angle to move the platform vertically upwards. At a center position (also the storage position) in which the platform 38 is aligned with the frame members 48, the lifting arms 44 are parallel to the platform. As the platform 38 is lifted above the center position to an unloading position (or raised position), the lifting arms rotate through a predetermined angle and form an angle with the platform as described below in more detail.

To move to the storage position, the lifting apparatus 32 may be moved to the central position so that the platform 38, lifting arms 44 and frame members 48 are parallel to and aligned with each other. Thus, in the storage position, the total height of the stored lifting apparatus is approximately equal to the height of the frame members that is approximately equal to the height of the platform. Once the lifting apparatus is in the storage position, it may move in a horizontal direction underneath the vehicle so that the entire platform is stored underneath the vehicle. For the lifting apparatus installed at the rear door 36, the lifting apparatus may slide underneath of the vehicle as described above or flip vertically upwards as will be described in more detail with reference to FIG. 5*a*. The construction of the lifting apparatus is described in more detail below with reference to FIGS. 9–19.

The total height of the stored lifting apparatus is approximately 3–4 inches (as opposed to 6–9 inches for conventional lifting apparatus) so that the ground clearance of the vehicle is not unduly restricted if the lifting apparatus is stored underneath the vehicle. The compact storage height of the lifting apparatus also provides other advantages over the conventional lifting apparatus. For example, the lifting apparatus in accordance with the invention may be used with other lower ground clearance vehicles that could not typically accommodate a typical lifting apparatus. Now, a vehicle having another embodiment of the lifting apparatus installed therein will be described.

Figure 2:
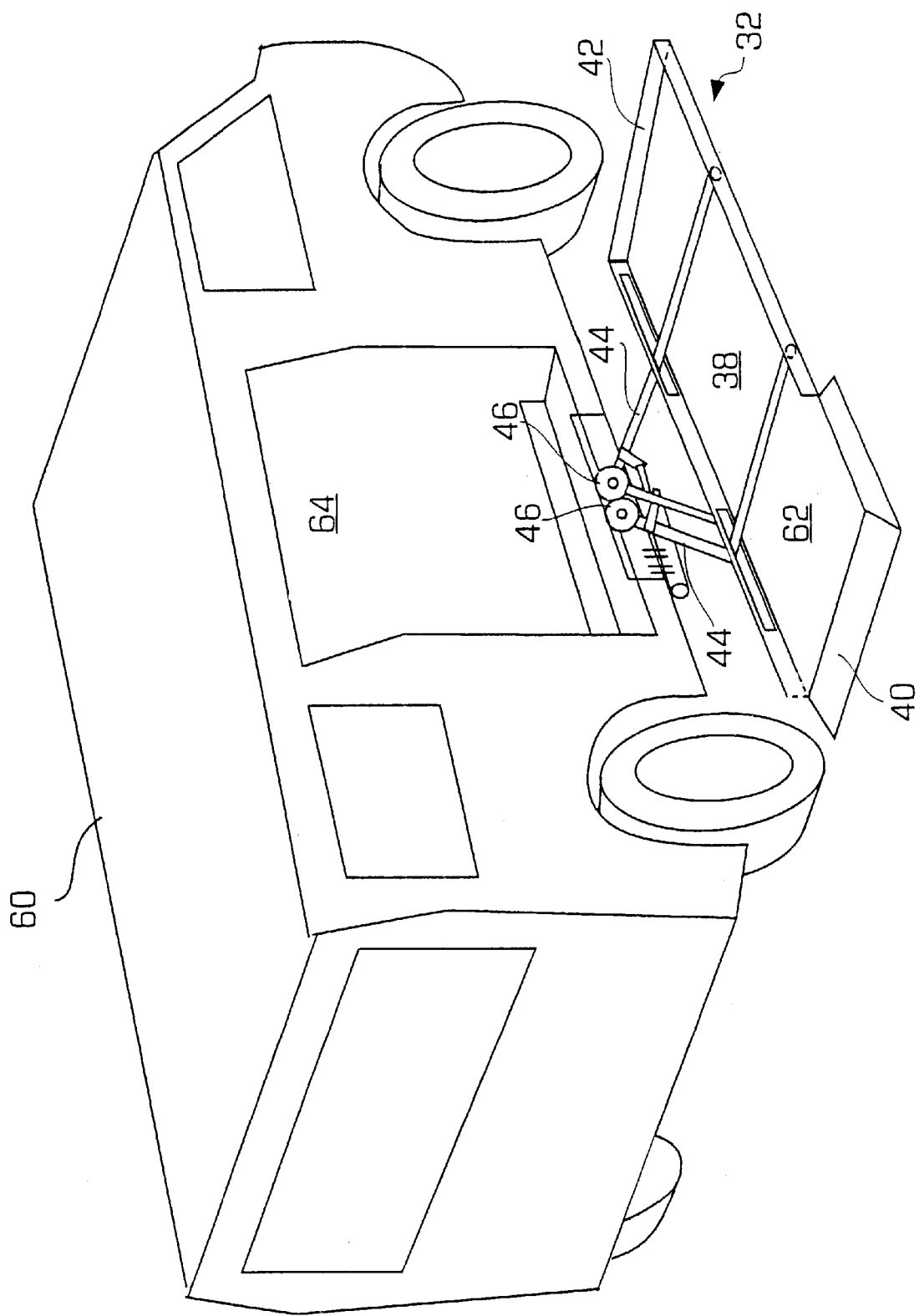
FIG. 2 is a diagram illustrating a vehicle with another embodiment of a lifting apparatus in accordance with the invention.

FIG. 2 is a diagram illustrating a vehicle 60 with another embodiment of the lifting apparatus 32 in accordance with the invention. In this embodiment, the lifting apparatus 32 has a lower space requirement. This lifting apparatus 32 may include the same platform 38, lifting arms 44 and torque gears 46 as described above and may also include an entry platform 62 having the ramp portion 40. The lifting apparatus operates in the same manner as described above and is stored underneath the floor of the vehicle. A wheelchair user may enter the lifting apparatus using the ramp 40 and the entry platform 62 to move onto the platform 38. The lifting apparatus may then lift the platform 38 vertically with no horizontal motion up to the vertical level of a door 64 of the vehicle so that the wheelchair user may exit the platform into the vehicle. Now, a lifting apparatus stored in the floor of a vehicle will be described.

FIG. 3 is a diagram illustrating the lifting apparatus 32 in accordance with the invention stored in the floor of a vehicle 70. In this diagram, a wheelchair 72 is shown already sitting on the platform 38 of the lifting apparatus. The lifting apparatus rests and is stored within a floor well 78 of the vehicle. While the wheelchair is on the platform 38, the it may be tied down to the platform using a tie-down cleat 74 and a strap 76 that wraps around the wheelchair so that the wheelchair user may sit in the wheelchair on top of the platform while the vehicle is in motion. This in-the-floor lifting apparatus in accordance with the invention provides several advantages. First, the wheelchair may be tied down to the platform during the trip in the vehicle so that the wheelchair does not need to be moved off of the platform prior to movement of the vehicle. In addition, to adjust for different height wheelchair users or to adjust the height of the wheelchair user to see through the window of the vehicle, the platform may be lowered or raised within the floor well 78 as shown by an arrow 80. Now, the lifting apparatus installed within various vehicles will be described.

Figure 5C:
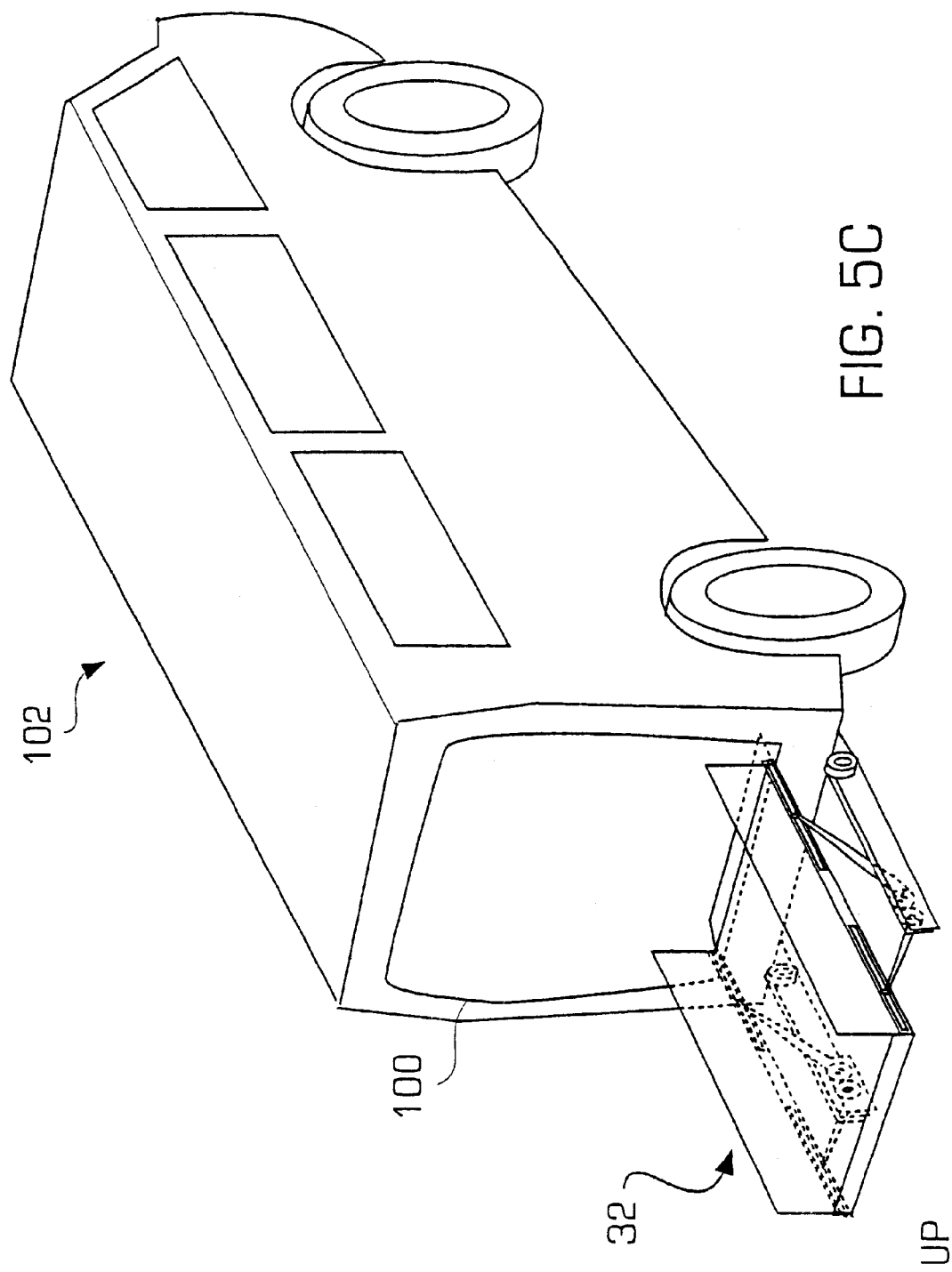

FIGS. 4*a*–5*c* show the lifting apparatus, at various positions, installed in various vehicles. For example, FIGS. 4*a*–4*c* show the lifting apparatus in the lowered, central and raised positions, respectively, installed in a side door 90 of a van 92. The operation and construction of the lifting apparatus 32 shown is as described above so it will not be described here. FIGS. 5*a*–5*c* are diagrams illustrating the lifting apparatus 32 in accordance with the invention in a stored, lowered and raised positions, respectively, when attached to a rear door 100 of a vehicle 102. In this example, the lifting apparatus 32 is hinged so that it folds up against the rear door when in the stored position. The lifting apparatus in this example has a similar construction and operation as the above examples. Now, several examples of the lifting apparatus installed in a vehicle that requires a larger lifting distance will be described.

Figure 6:
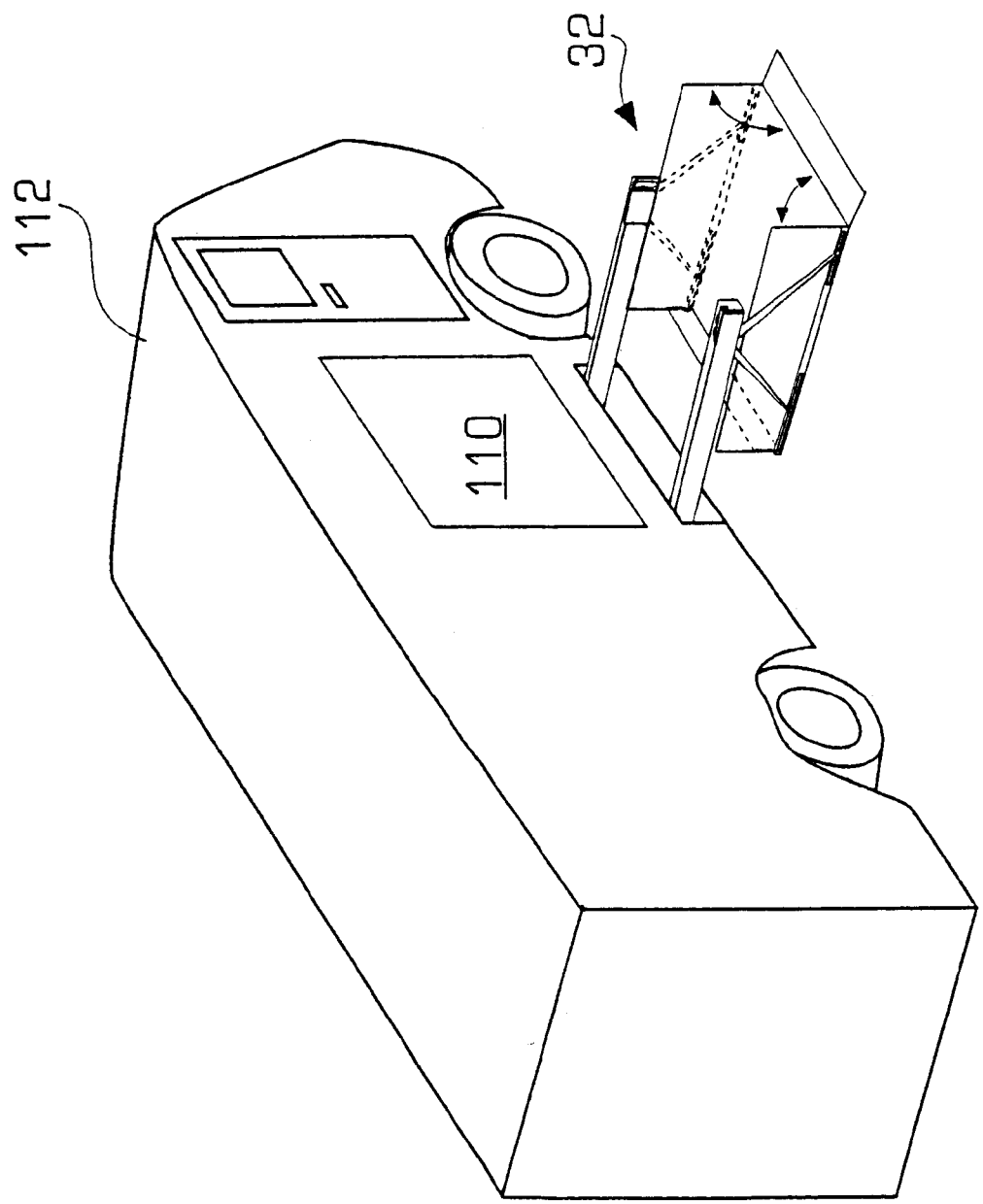
FIG. 6 is a diagram illustrating a lifting apparatus in accordance with the invention installed in a recreation vehicle.

FIG. 6 is a diagram illustrating the lifting apparatus 32 in accordance with the invention installed in a side door 110 of a recreation vehicle 112. In this example, the construction and operation of the lifting apparatus are similar to that described above so that it will not be described here. The difference is that the lifting apparatus must lift the platform with the wheelchair higher than for other vehicles. In particular, the lifting apparatus may need to lift the platform more than 32 inches. The conventional lifting apparatus cannot typically lift the platform more than 30 inches due to their construction. To lift the platform a greater distance using the lifting apparatus in accordance with the invention, the platform length is extended so that longer lifting arms may be used along with a stronger motor so that the platform is lifted farther off of the ground with more weight capacity. In one embodiment of the lifting apparatus, telescoping lifting arms may be used as will be described in more detail below with reference to FIGS. 13*a*–13*c*.

Figure 7:
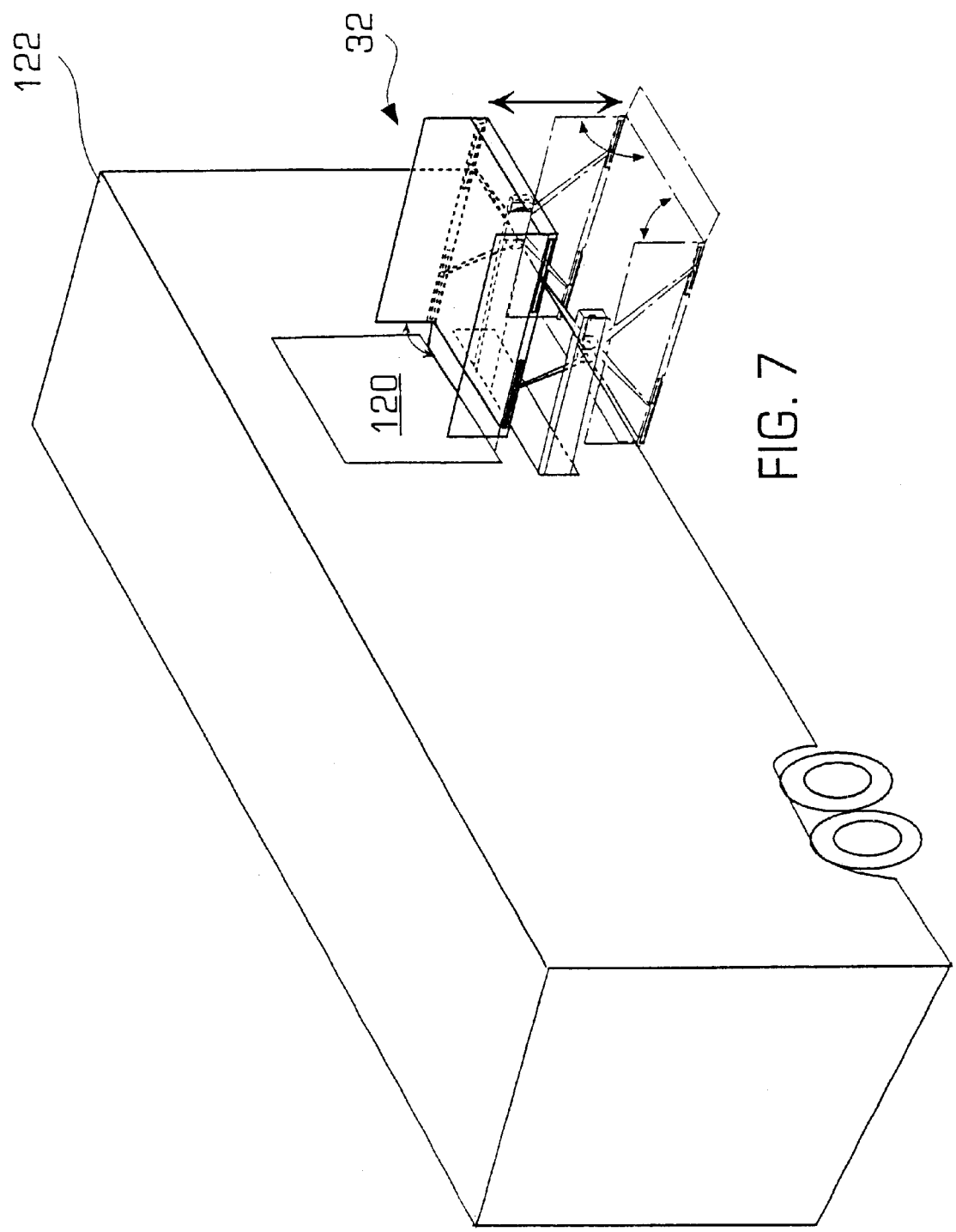
FIG. 7 is a diagram illustrating a lifting apparatus in accordance with the invention installed in a train car.

FIG. 7 is a diagram illustrating the lifting apparatus 32 in accordance with the invention installed in a side door 120 of a train car 122. Similar to the lifting apparatus described above with reference to FIG. 6, the lifting apparatus must lift the platform more than 30 inches so that telescoping lifting arms may be used or the length of the platform and the lifting arm may be extended. Thus, the lifting apparatus in accordance with the invention may be easily modified for a variety of different uses and to lift a wheelchair user or weight a variety of different heights. Now, an example of the lifting apparatus installed on a flight of stairs will be described.

Figure 8:
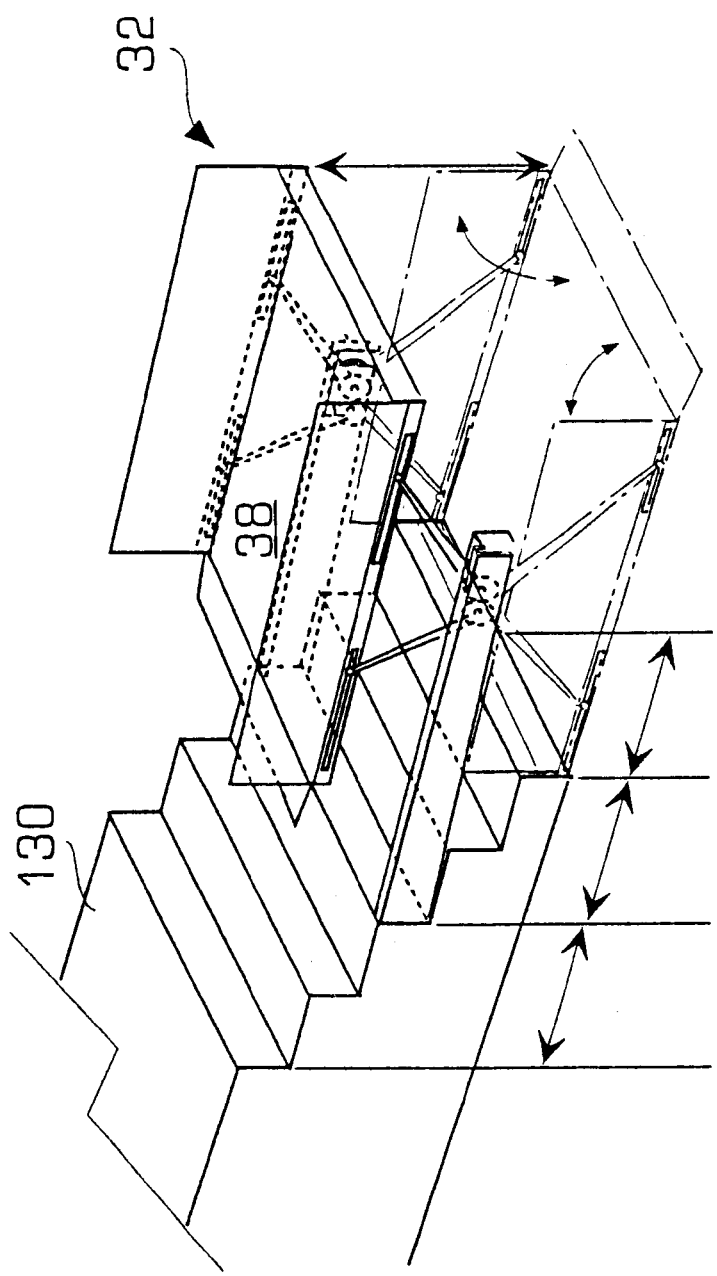
FIG. 8 is a diagram illustrating a lifting apparatus in accordance with the invention installed on a flight of stairs.

FIG. 8 is a diagram illustrating the lifting apparatus 32 in accordance with the invention installed on a flight of stairs 130. In this example, the lifting apparatus 32 may be installed on the flight of stairs 130 to help a disabled person (such as someone in a wheelchair) get up or down the stairs without assistance. To accomplish this, the lifting apparatus moves the platform 38 up or down to lift or lower the platform and then may move horizontally. In particular, when the disabled person goes up the stairs, the platform is moved vertically up to the height of the top step and then horizontally towards the steps so that the edge of the platform is flush with the edge of the top step. When the disabled person is going down the stairs, the platform is first moved out away from the stairs so that the it will not strike the stairs and then is moved down through the same motion as above to the ground level. Otherwise, the lifting apparatus operates in a similar manner to that described above and has a similar construction so that it will not be described here any further. Now, the structural, mechanical and operational details of the lifting apparatus in accordance with the invention will be described.

Figure 9:
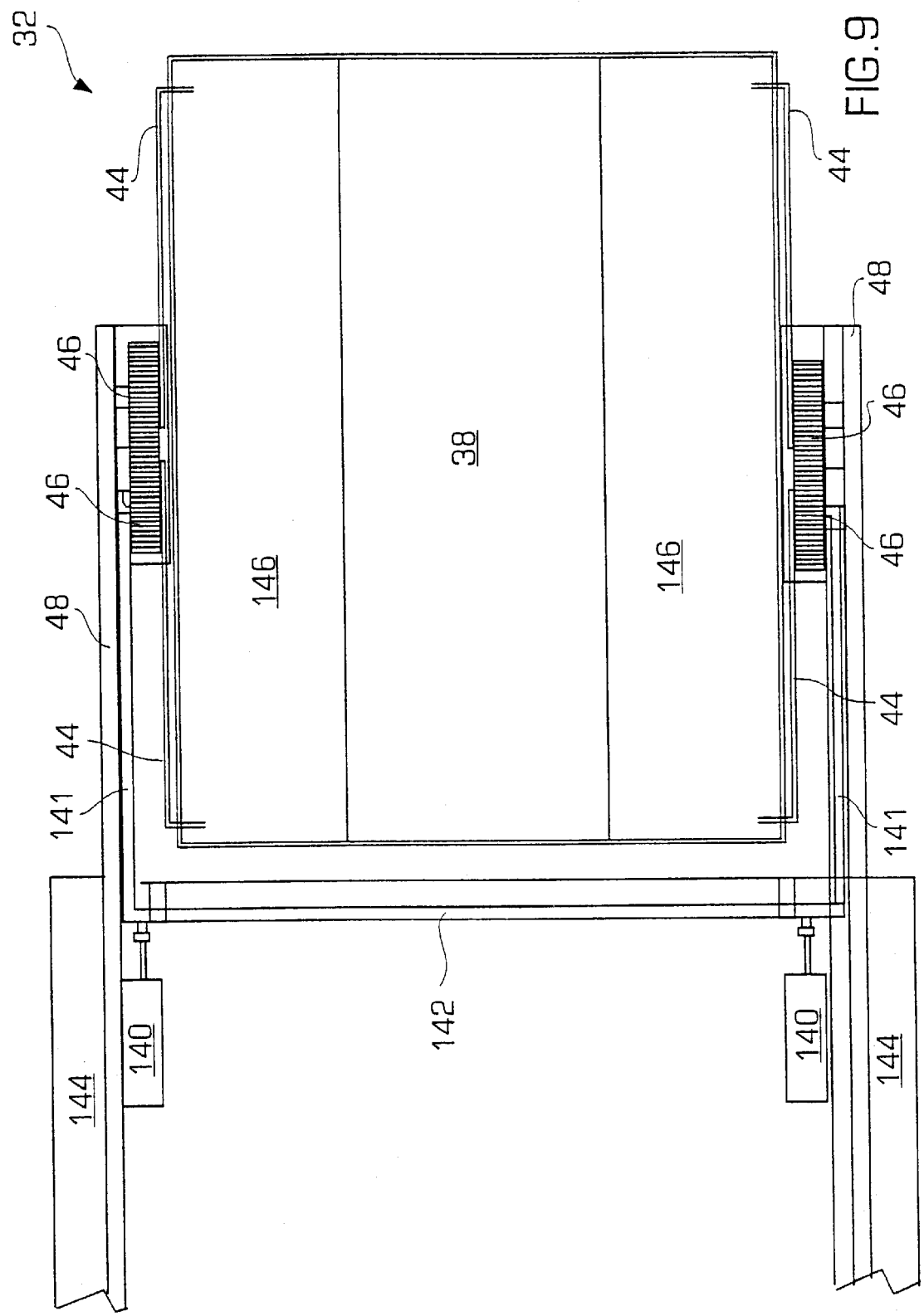
FIG. 9 is a diagram illustrating more details of the lifting apparatus in accordance with the invention.

FIG. 9 is a diagram illustrating more details of the structure of the lifting apparatus 32 in accordance with the invention. As described above, the lifting apparatus may include the platform 38 that is connected, at each side, by the pair of lifting arms 44 to the pair of torque gears 46 that move the platform up and down. The gears 46 are then rotatably connected to the frame members 48. To rotate the torque gears that move the platform, the lifting apparatus may include a driving mechanism 140 on each side of the platform that drives the gears 46 on each side of the platform. The driving mechanism may be a hydraulic ram if a hydraulic system is being used to lift the platform or an electric motor. In either case, the driving mechanism may be disconnected from the gears 46 so that the platform may be raised or lowered manually in case of a failure of the driving mechanism. The torque from the driving mechanisms may be transferred to the gears 46 via a torque transfer arm 141 on each side of the platform. To ensure that the torque from the two driving mechanisms 140 is balanced, the lifting apparatus may include a torque bar 142 that connects the two driving mechanisms.

The lifting apparatus may also include a retraction system 144 that permits the lifting apparatus to move in a horizontal direction into a storage position. The platform 38 may also include a fold out portion 146 that may be folded down while the lifting apparatus is stored. The fold out portions 146 may then be folded out to extend the width of the platform while the platform is being used to lift a disabled person. The fold out portions 146 permit the width of the platform to be easily adjusted to handle extra wide items, such as extra wide wheelchairs. The lifting apparatus 32 is balanced in that each side of the platform is supported and lifted so that the platform is more stable. In addition, the lifting apparatus uses an independent driving mechanism at each side of the platform that helps to ensure a smooth lifting motion. The dual driving mechanisms also permit the total lifting weight of the platform to be split between the two driving mechanisms. Now, more details of the lifting apparatus using torque gears will be described.

Figure 10:
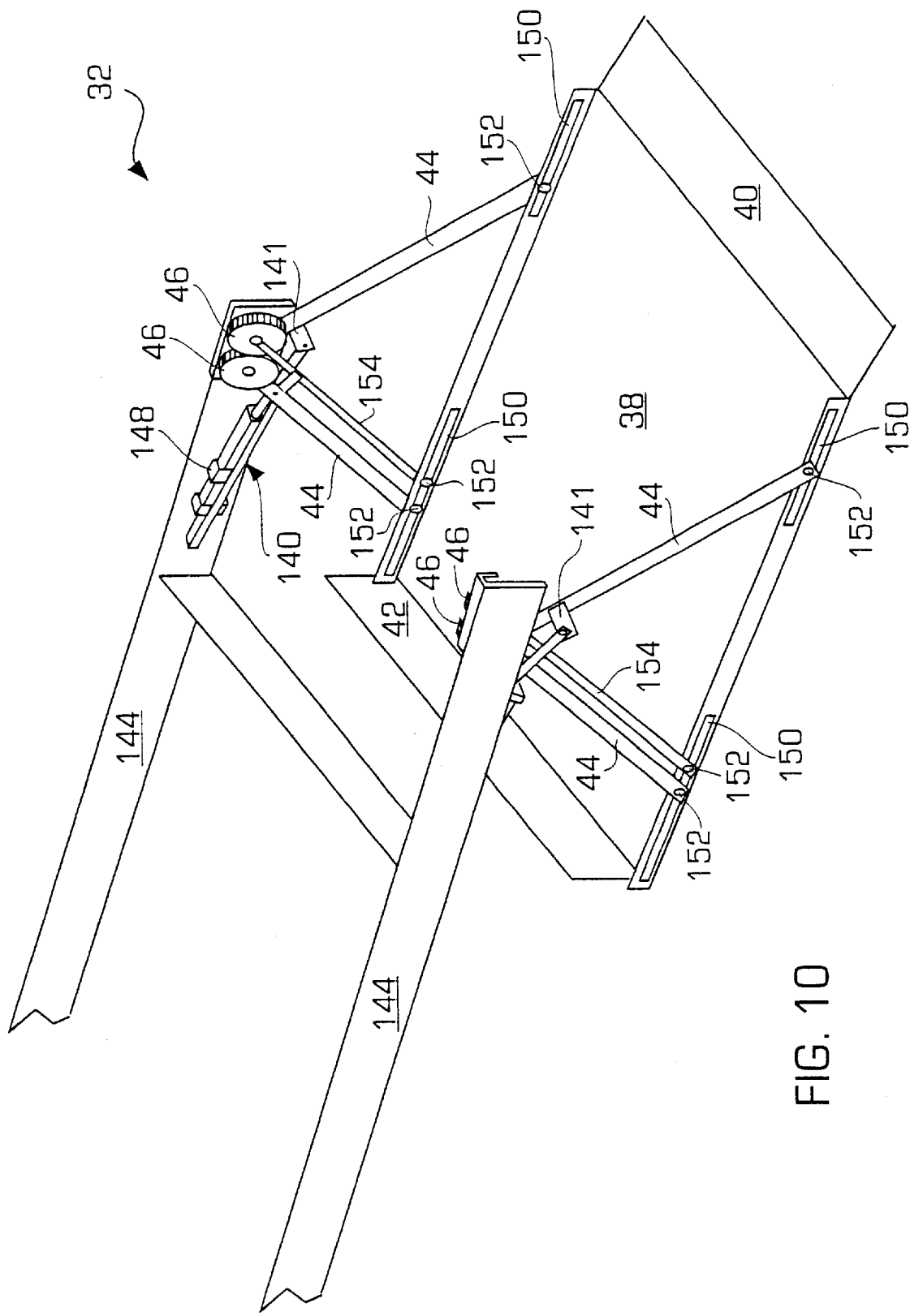
FIG. 10 is a diagram illustrating an embodiment of the lifting apparatus in accordance with the invention using torque gears.

FIG. 10 is a diagram illustrating a first embodiment of the lifting apparatus 32 in accordance with the invention. In this embodiment, the torque gears 46 are used to rotate the lifting arms 44 to lift the platform. In the second embodiment described below, the torque gear may be replaced by a torque thread that may also be used to rotate the lifting arms 44. The lifting arms 44, as shown, are rigidly connected to the torque gears so that the lifting arms lift or lower the platform as the gears are rotated. In this embodiment, like reference numerals refer to like elements that will not be described in any detail here. The lifting apparatus 32 shown is in the down position with the ramp 40 extended to permit a disabled person to move onto the platform 38 from the ground. The torque gears 46 of each side of the platform have meshed teeth so that the gears rotate in a synchronized manner and the lifting arms 44 therefore also move in a synchronized manner to ensure a smooth movement of the platform.

The gears 46 may rotate through an angle of approximately 120° at constant torque to move the platform from a lowered position to a raised position. In a storage position, the gears may be rotated about 60° so that the lifting arms 44 are parallel to the retracting system 144 and tucked away into the retracting system channel. The tucking away of the lifting arms 44 when the lifting apparatus is in the storage position permits a maximum amount of leverage to lift the platform with a minimum overall storage height of the lifting apparatus. The driving mechanism 140, which may be a hydraulic ram or an electric motor, may include a torque stabilizing pin 148 that ensures that the driving mechanism does not move in the horizontal direction away from the lifting arms as torque is being applied to the lifting arms, but that the driving mechanism may rotate vertically about a pivot point as described below. For the lifting arms 44 to move through a 120° arc when lifting the platform, the lifting arms are located outside of the platform. In addition, there may be a slot 150 in the platform's walls and a wheel 152 on the end of the lifting arms 44 that fits into the slot 150 and moves back and forth in the slot as the platform is raised or lowered. In particular, when the platform is in the up or down positions, the wheel 152 may be located in the slot closer to the center of the platform whereas when the platform is in the central storage position, the wheels 152 may be located in the slot 150 at the ends of the platform. This movement of the wheels in the slots permits the lifting arms 44 to tuck away flat when the platform is in the storage position.

The lifting apparatus 32 may also include a stabilization arm 154 that also has the wheel 152 that moves in the slot 150. The stabilization arm 154 may keep the platform parallel to the retraction system 144 and the frame members. Thus, an asymmetric or off-center loading of the platform will not cause the platform to tilt that further ensures the safety of the disabled person on the platform even if the platform is not symmetrically loaded. To rotate the lifting arms 44, the driving mechanism 140 may be connected to each lifting arm 44 by the torque transfer arm 141. Now, a second embodiment of the lifting apparatus that uses a torque thread to rotate the lifting arms will be described.

Figure 11:
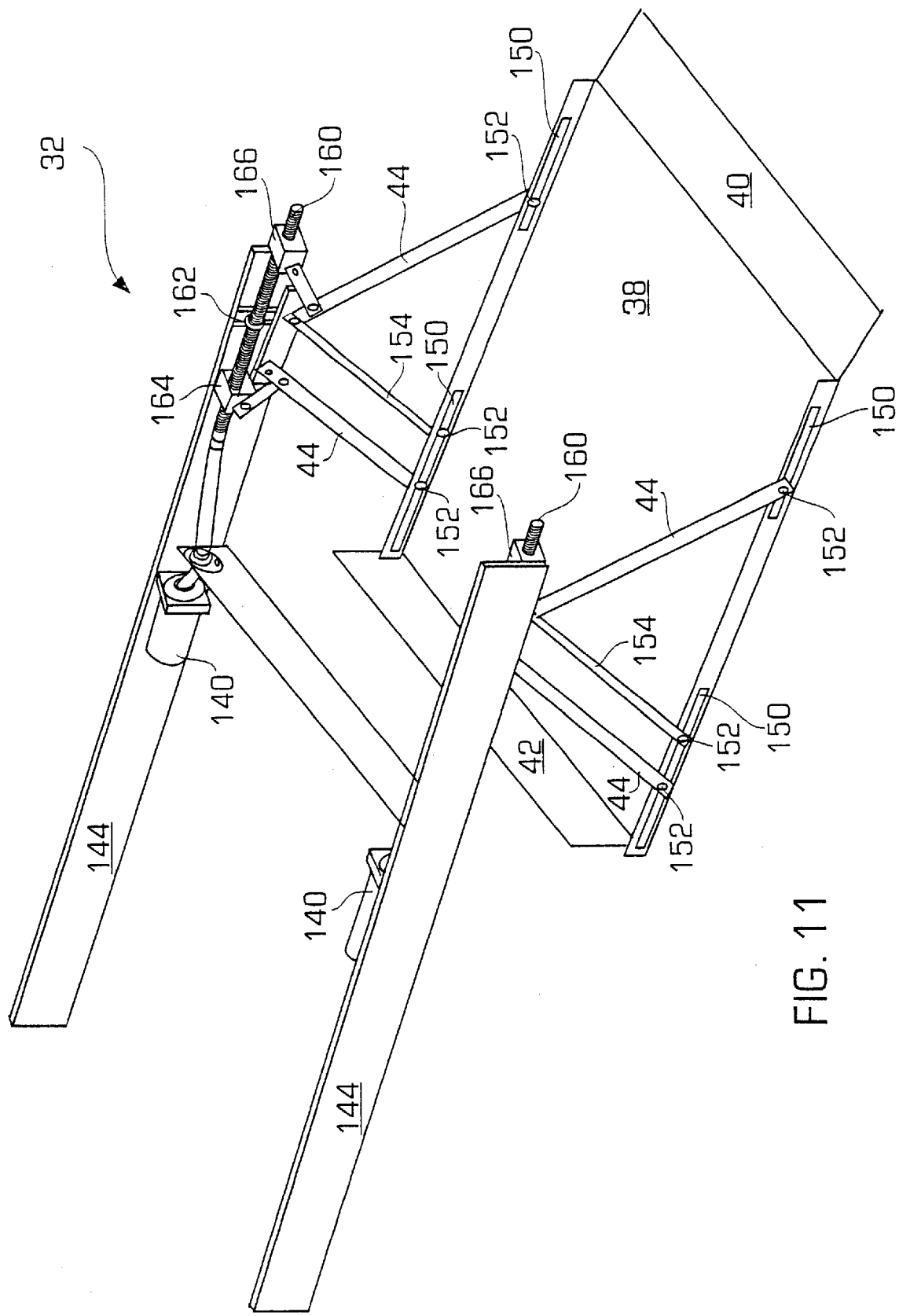
FIG. 11 is a diagram illustrating another embodiment of the lifting apparatus in accordance with the invention using torque threads.

FIG. 11 is a diagram illustrating a second embodiment of the lifting apparatus 32 in accordance with the invention that uses a torque thread 160 to rotate the lifting arms 44 instead of the torque gears. In this diagram, like reference numerals designate like elements that will not necessarily be described here. This embodiment of the lifting apparatus 32 operates in the same manner as the lifting apparatus shown in FIG. 10 so that the operation of the lifting apparatus will not be described here. In this embodiment, instead of the torque gears of FIG. 10, a torque thread 160 on each side of the platform may translate the torque of the driving mechanism 140 into rotation of the lifting arms 44 and the stabilization arm 154. The pair of torque threads 160 provide synchronized raising and lowering of the platform by the synchronized rotation of the lifting arms. To stabilize the torque applied to the lifting arms 44, the driving mechanism may include a centering torque stabilizer 162. In this embodiment, the driving mechanism may be a gear reduction electric motor that provides the rotational torque to rotate the lifting arms. To rotate the lifting arms, the thread 160 may pass through a first and second converter 164, 166 that translate the rotational screw motion of the thread 160 into rotational motion of the lifting arms 44 and the stabilizing arm 154. Now, more details of the lifting apparatus in the lowered, storage and raised positions will be described.

FIGS. 12a–12c are diagrams illustrating the lifting apparatus 32 in a raised position, in a central storage position and in a lowered position, respectively. In these figures, the stabilizing arm 154 is not shown for clarity. As shown in FIG. 12a, when the lifting apparatus is in the raised position, the platform 38 is above the retracting system channel 144, the lifting arms 44 are rotated to some predetermined angle, α, away from the channel 144 by the torque gears 46. In addition, the wheels 152 at the end of the lifting arms 44 are in the middle of the slots 150. Similarly, as shown in FIG. 12c, when the lifting apparatus 32 is in the lowered position, the lifting arms 44 are also rotated to a predetermined angle, α, away from the channel 144 by the torque gears 46. However, when the lifting apparatus is in the storage position as shown in FIG. 12b, the lifting arms 44 are parallel to both the channel 144 and the platform 38 so that the total storage height of the lifting apparatus is equal to the height of the platform. In particular, since the lifting arms 44 are narrower than the platform 38, they may tuck away within the platform. In the storage position, the retracting system 144 may move the lifting apparatus horizontally so that it may be stored, for example, underneath a vehicle. Now, more details of the lifting apparatus having a telescoping lifting arm in the raised, lowered and storage positions will be described.

FIGS. 13a–13c are diagrams illustrating the lifting apparatus 32 in accordance with the invention having telescoping lifting arms in a raised position, a central position and a lowered position, respectively. In these figures, the stabilizing arm 154 is not shown for clarity. In this embodiment, the lifting arms 44 may include a first arm portion 160 and a second arm portion 162 that are rotatably connected together by a hinge 164. The second portions 162 are rigidly connected to the gears 46 while the first portions 160 may have the wheels 152 at their ends that roll in the slots 150 in the platform. As shown in FIG. 13a, when the lifting apparatus is in the raised position, the platform 38 is above the retracting system channel 144, the lifting arms 44 are rotated to some predetermined angle, α, away from the channel 144 by the torque gears 46. In addition, the wheels 152 at the end of the first arm portions 160 of the lifting arms 44 are in the middle of the slots 150. Similarly, as shown in FIG. 13c, when the lifting apparatus 32 is in the lowered position, the lifting arms 44 are also rotated to a predetermined angle, α, away from the channel 144 by the torque gears 46. However, when the lifting apparatus is in the storage position as shown in FIG. 12b, the lifting arms 44 are parallel to both the channel 144 and the platform 38 so that the total storage height of the lifting apparatus is equal to the height of the platform. In particular, since the lifting arms 44 are narrower than the platform 38, they may tuck away within the platform. In the storage position, the retracting system 144 may move the lifting apparatus horizontally so that it may be stored, for example, underneath a vehicle. Now, the operation of the lifting apparatus will be described in more detail.

FIGS. 14a and 14b are diagrams illustrating more details of the first embodiment of the lifting apparatus 32 in the raised and lowered positions, respectively. The structure of the lifting apparatus 32 is the same as described above and will not be described in detail here. In the raised position shown in FIG. 14a, there may be a 60° angle between the lifting arm 44 and the plane in which the torque gears 46 are located. In the lowered position, as shown in FIG. 14b, there may be a 65° angle between the lifting arm 44 and the plane in which the torque gears 46 are located. Thus, the total angle of rotation of the lifting arms 44 is 125°. As described above, the lifting arms 44 and the torque gears 46 are in the same plane when the lifting apparatus is in the stored or central position.

In the raised position as shown in FIG. 14a, the platform 38 is above the torque gears 46. As described above, the stabilization arm 154 keeps the platform level even under uneven loading of the platform. The stabilization arm 154 is rotatably connected to the axle about which the torque gear 46 rotates, but is not actually connected to either the torque gear 46 or the lifting arm 44. In the raised position, the lifting mechanism 140, which may be a hydraulic ram in this embodiment, is extended to full length and the hydraulic ram is parallel to the plane of the torque gears (i.e., there is no vertical movement of the lifting mechanism. When the lifting apparatus is in the lowered position, the lifting mechanism has slightly rotated downwards about the stabilizing pin 148 so that the lifting mechanism is applying the torque in a horizontal direction to the lifting arms 44. The operation of the lifting mechanism in accordance with the invention will now be described in more detail.

Figure 15:
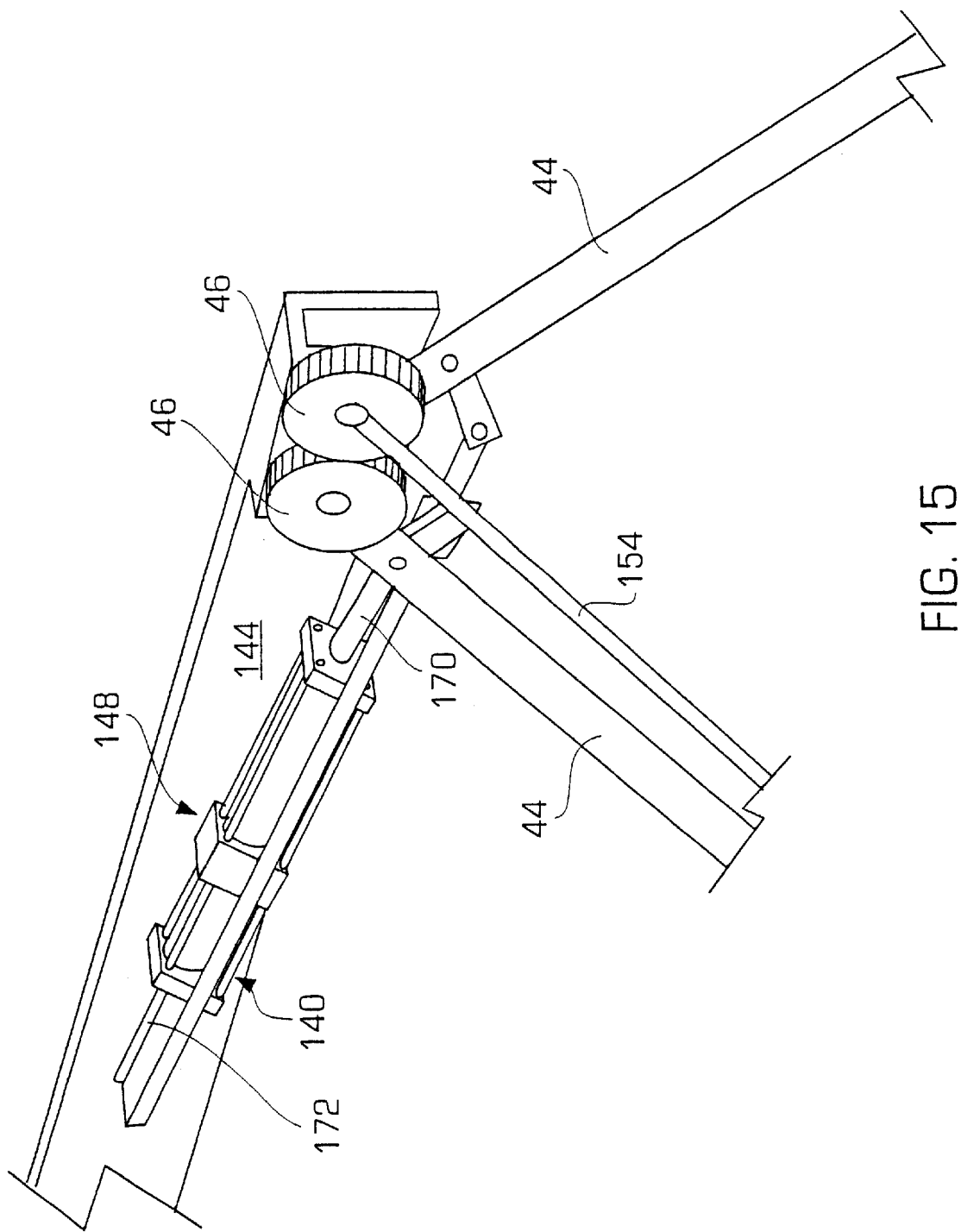
FIGS. 15–16 are diagrams illustrating more details of the torque gears of an embodiment of the lifting apparatus shown in FIG. 10.
Figure 16:
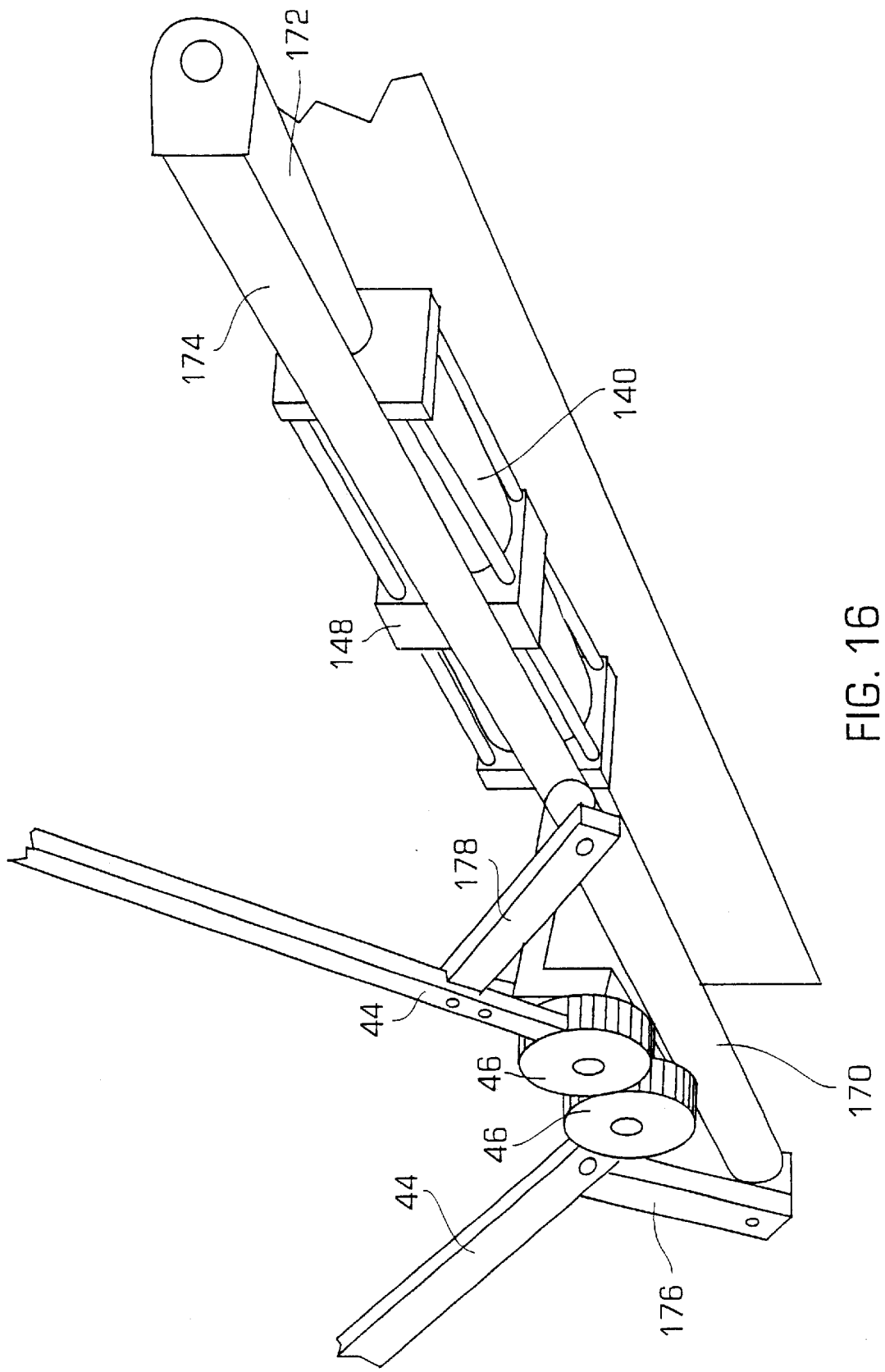

FIGS. 15–16 are diagrams illustrating more details of the lifting mechanism 140 and torque gears 46 of the first embodiment of the lifting apparatus 32. In these figures, the lifting mechanism 140 is a hydraulic ram. The lifting mechanism may include the torque stabilizing pin 148 that keeps the hydraulic ram stationary in the horizontal plane (i.e., no horizontal movement that would reduce the effectiveness of the lifting mechanism), but permit the lifting mechanism to pivot in the vertical plane. For example, as shown in FIG. 15, when the lifting apparatus is in the lowered position, the lifting mechanism is slightly tilted on the vertical axis so that the torque is always horizontally applied to the lifting arms 44. This ensures that the platform is kept uniformly perpendicular to the lifting arms 44 that is turn keeps the platform vertically level.

The hydraulic ram in this embodiment may be a double side push ram that provides equal torque from each side of the ram housing. In particular, the hydraulic ram may include a first ram 170 and a second ram 172 located at opposite horizontal ends of the hydraulic ram that move in and out of the hydraulic ram. Each rams 170, 172 may be rotatably connected to a connecting arm 174, 176 that is in turn connected to the lifting arms 44. The connecting arm 174 may further include a second connecting arm 178 rotatably between the connecting arm 174 and the lifting arm 44.

In operation, to move the platform to a raised position, the hydraulic ram pushes the ram 170 out while pulling the other ram 172 into the hydraulic ram. The outward movement of the ram 170 causes the connecting arm 176 to be pushed out that in turn causes the lifting arm 44 to rotate upwards about the torque gear 46. As described above, the torque gears 46 assure that each lifting arm 44 is rotating is synchronization the other lifting arm that ensures a level platform. At the same time, the movement of the other ram 172 pushes the connecting arm 174 towards the torque gear that causes the second connecting arm 178 to move towards the gears. The movement of the second connecting arm 178 causes the lifting arm to rotate upwards about the torque gear 46. The wheels 152 in the slots 150 may then move in the slot as the lifting arms 44 are rotating that causes the platform to move vertically without any horizontal movement. In this manner, the platform is raised to the raised position. Similarly, for moving the platform to the lowered position, the ram 170 is pulled into the hydraulic ram and the ram 172 is pushed out of the hydraulic ram in order to cause the lifting arms 44 to rotate down and move the platform into the lowered position. Now, the operation of the second embodiment of the lifting apparatus using the torque threads will be described.

Figure 17:
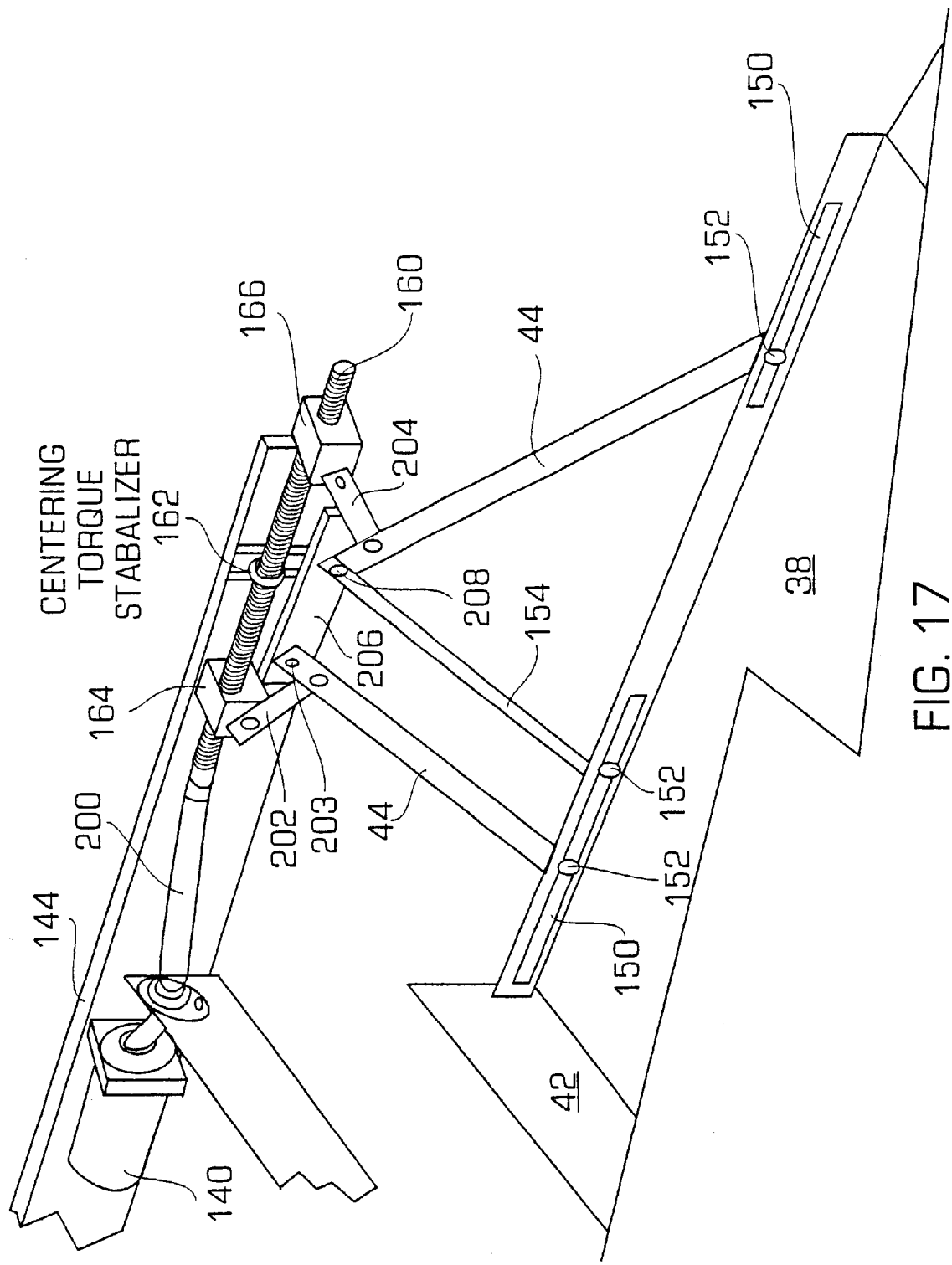
FIG. 17 is a diagram illustrating details of the torque threads of the embodiment of the lifting apparatus shown in FIG. 11.

FIG. 17 is a diagram illustrating details of the torque threads 160 of the second embodiment of the lifting apparatus 32. As with the embodiment described above, the rotation of the lifting arms 44 to lower/raise the platform 38 is synchronized to ensure a level platform. In this embodiment, the torque thread ensures that the rotation of the lifting arms 44 is synchronized. In this embodiment, the lifting mechanism 140 is an electric motor and in particular a gear reduction electric motor. The motor 140 may have a flex jointed drive shaft 200 attached to it so that the rotational torque requirements are met. In particular, the flex jointed drive shaft 200 permits the motor to output purely horizontal motion that may be translated into horizontal motion of the thread 160. The thread 160 passes through the first converter 164, the torque stabilizer 162 and the second converter 166. The torque stabilizer ensures that the motion of the thread 160 is kept horizontal at all times. The lifting apparatus may further include first and second connecting arms 202, 204 connected to the respective converters 164, 166 and a plate 206 to which the lifting arms 44 are rotatably connected. These connecting arms and plate convert the rotational motion of the thread 160 into rotational motion of the lifting arms 44 that moves the platform up and/or down.

In operation, as the thread is turned, the converters 164, 166 both move in a direction on the thread 160 depending on whether the platform is being raised or lowered. If the platform is being raised, the converters 164, 166 move towards the motor 140. As the converter 164 moves towards the motor, it causes the connecting arm 202 to rotate that in turn causes the lifting arm 44 to rotate about a pivot point 203 upwards and lift the platform 38. At the same time, the other converter 166 causes the connecting arm 204 to rotate that causes the lifting arm 44 to rotate about a second pivot point 208 that also lifts the platform. Similarly, when the platform is being lowered, the converters 164, 166 move away from the motor that causes the lifting arms 44 to rotate downwards. Now, the vertical motion of the lifting apparatus in accordance with the invention will be described.

Figure 18:
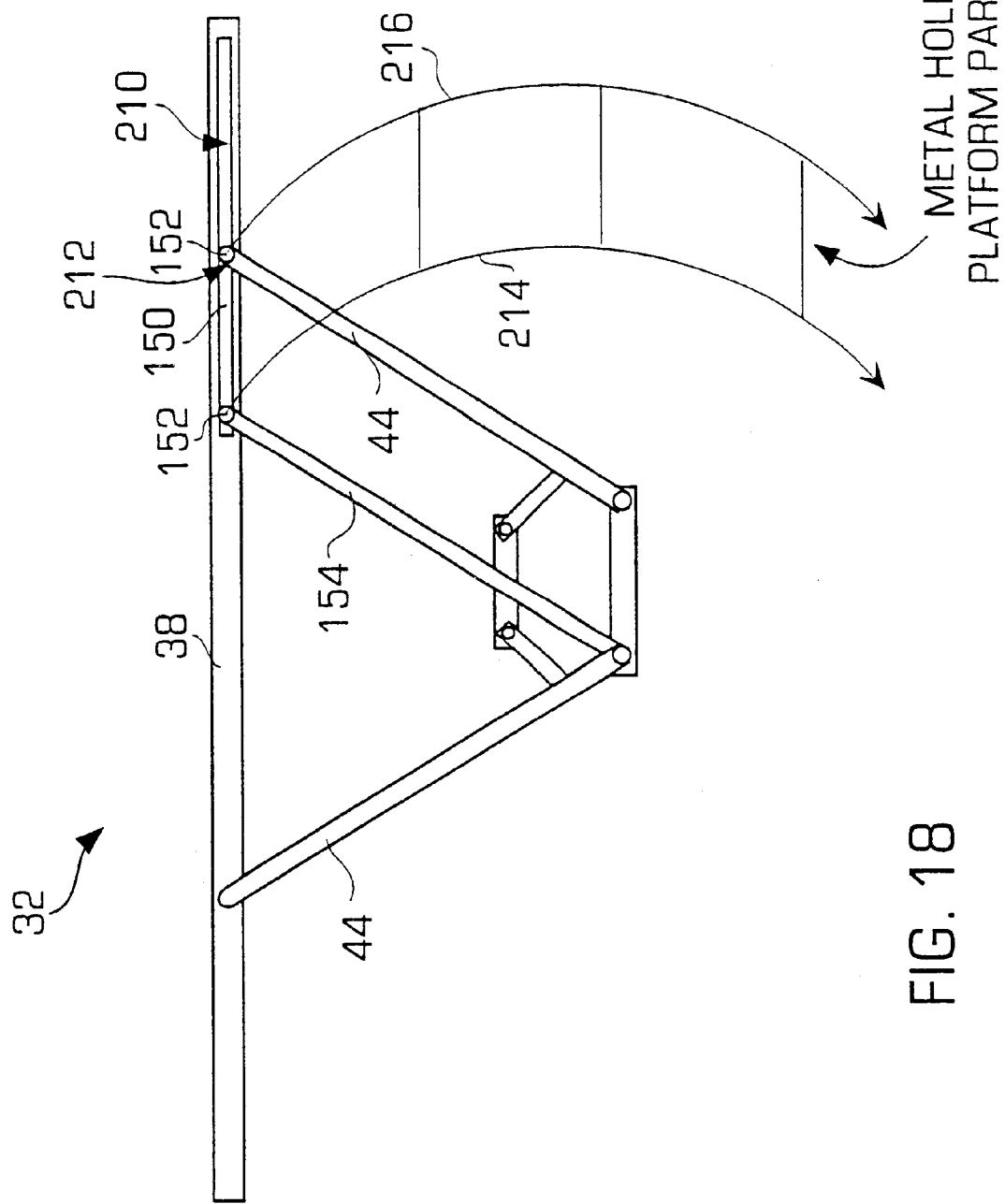
FIG. 18 is a diagram illustrating the motion of the lifting arms of the lifting apparatus in accordance with the invention.

FIG. 18 is a diagram illustrating the motion of the lifting arms of the lifting apparatus 32 in accordance with the invention. As shown, the lifting arm 44 and the stabilizing arm 154 may be connected together in the slot 150 by a plate 210. The motion of the lifting arm in the slot may be limited by a stop 212. As shown, as the platform 38 is moved, the wheel 152 of the lifting arm 44 and the stabilizing arm 154 move in the same arc 214, 216 and remain the same distance apart. This motion ensures that the motion of the platform is vertical with no horizontal motion.

While the foregoing has been with reference to a particular embodiment of the invention, it will be appreciated by those skilled in the art that changes in this embodiment may be made without departing from the principles and spirit of the invention as set forth in the appended claims.

What is claimed is:

1. An apparatus for lifting an object, comprising:
 a ramp onto which the object is positioned prior to lifting; and
 means for vertically lifting the ramp from a first position to a second position, the ramp remaining substantially in the same horizontal position during the lift so that the object on the ramp is less likely to fall off of the ramp during the lifting, the vertical lifting means further comprises a pair of lifting arms located at opposite sides of the ramp and slidably attached to the ramp, each pair of lifting arms rotating through a predetermined angle to move the ramp vertically from the first position to the second position, the vertical lifting means further comprises a down position in which each pair of lifting arms forms a first predetermined angle with respect to the ramp, a storage position wherein the lifting arms are parallel to each other and the ramp and an up position in which each pair of lifting arms forms a second predetermined angle with respect to the ramp.

2. The apparatus of claim 1, wherein the first predetermined angle and the second predetermined angle are substantially equivalent.

3. The apparatus of claim 1, wherein the sum of the first predetermined angle and the second predetermined angle is approximately 120°.

4. The apparatus of claim 1, wherein each pair of lifting arms further comprises a first end rotatably connected to a frame that supports the lifting mechanism and second end having a wheel that slides in a track in the ramp so that the wheel moves in the track as the ramp is moved up and down and so that the ramp and the arms are parallel to each other in the storage position.

5. The apparatus of claim 4, wherein the vertical lifting means further comprises a stabilization arm slidably connected at each side of the ramp to stabilize the ramp and maintain the ramp in a position parallel to the ground during movement.

6. The apparatus of claim 5, wherein the vertical lifting means further comprises a torque gear at each side of the ramp, each pair of lifting arms being rigidly connected to the torque gear so that as the torque gear rotates through a predetermined angle, the lifting arms rotate through the same predetermined angle.

7. The apparatus of claim 6, wherein each pair of lifting arms further comprise first arm portions rigidly fixed to the torque gear, second arm portions rotatable connected at one end to the first arm portions and rotatably connected to each other at a mid point and slidably connected to the ramp at a second end so that an object on the ramp is lifted to a higher position.

8. The apparatus of claim 5, wherein the vertical lifting means further comprises a torque thread at each side of the ramp, each pair of lifting arms being rigidly connected to the torque thread so that as the torque gear moves, the lifting arms rotate through the same predetermined angle.

9. The apparatus of claim 8, wherein each pair of lifting arms further comprise first arm portions rigidly fixed to the torque thread, second arm portions rotatable connected at one end to the first arm portions and rotatably connected to each other at a mid point and slidably connected to the ramp at a second end so that an object on the ramp is lifted to a higher position.

10. The apparatus of claim 1, wherein the pairs of lifting arms are located on the outside edge of the ramp so that, in the storage position, the ramp fits within the lifting arms.

11. The apparatus of claim 1, wherein the object is a wheelchair.

12. A method for lifting an object, comprising:

loading an object onto a ramp; and vertically lifting the ramp from a first position to a second position, the ramp remaining substantially in the same horizontal position during the lift so that the object on the ramp is less likely to fall off of the ramp during the lifting, the vertical lifting further comprises rotating a pair of lifting arms, located at opposite sides of the ramp and slidably attached to the ramp, through a predetermined angle to move the ramp vertically from the first position to the second position and wherein the vertical lifting further comprises positioning the ramp in a down position in which each pair of lifting arms forms a first predetermined angle with respect to the ramp, positioning the ramp in a storage position wherein the lifting arms are parallel to each other and the ramp and positioning the ramp in an up position in which each pair of lifting arms forms a second predetermined angle with respect to the ramp.

13. An apparatus for lifting an object, comprising:

a ramp onto which the object is positioned prior to lifting; and a lifting mechanism for vertically lifting the ramp from a first position to a second position, the ramp remaining substantially in the same horizontal position during the lift so that the object on the ramp is less likely to fall off of the ramp during the lifting, the lifting mechanism further comprising a pair of lifting arms located at opposite sides of the ramp and slidably attached to the ramp, each pair of lifting arms rotating through a predetermined angle to move the ramp vertically from the first position to the second position;

the lifting mechanism further comprises a down position in which each pair of lifting arms forms a first predetermined angle with respect to the ramp, a storage position wherein the lifting arms are parallel to each other and the ramp and an up position in which each pair of lifting arms forms a second predetermined angle with respect to the ramp;

wherein each pair of lifting arms further comprises a first end rotatably connected to a frame that supports the lifting mechanism and second end having a wheel that slides in a track in the ramp so that the wheel moves in the track as the ramp is moved up and down and so that the ramp and the arms are parallel to each other in the storage position; and a stabilization arm slidably connected at each side of the ramp to stabilize the ramp and maintain the ramp in a position parallel to the ground during movement.

14. An apparatus for lifting an object, comprising:

a ramp onto which the object is positioned prior to lifting; and a lifting mechanism for vertically lifting the ramp from a first position to a second position, the ramp remaining substantially in the same horizontal position during the lift so that the object on the ramp is less likely to fall off of the ramp during the lifting, the vertical lifting mechanism further comprising a pair of lifting arms located at opposite sides of the ramp and slidably attached to the ramp, each pair of lifting arms rotating through a predetermined angle to move the ramp vertically from the first position to the second position wherein the vertical lifting mechanism further comprises a storage position wherein the lifting arms are parallel to each other and the ramp so that the ramp and lifting mechanism have a low profile in the storage position, a down position in which the ramp is below the storage position and an up position in which the ramp is above the storage position.

\* \* \* \* \*